(12) United States Patent
Gray, Jr.

(10) Patent No.: US 11,221,249 B2
(45) Date of Patent: Jan. 11, 2022

(54) ENVIRONMENTAL SENSOR PLATFORM, SYSTEM AND METHOD

(71) Applicant: James R. Gray, Jr., Norfolk, VA (US)

(72) Inventor: James R. Gray, Jr., Norfolk, VA (US)

(*) Notice: Subject to any disclaimer, the term of this patent is extended or adjusted under 35 U.S.C. 154(b) by 454 days.

(21) Appl. No.: 16/194,272

(22) Filed: Nov. 16, 2018

(65) Prior Publication Data

US 2019/0226898 A1 Jul. 25, 2019

Related U.S. Application Data

(60) Provisional application No. 62/587,140, filed on Nov. 16, 2017.

(51) Int. Cl.
*G01F 23/00* (2006.01)
*G08C 17/02* (2006.01)
(Continued)

(52) U.S. Cl.
CPC ....... *G01F 23/0076* (2013.01); *G01C 13/008* (2013.01); *G01S 15/88* (2013.01);
(Continued)

(58) Field of Classification Search
CPC . G01F 23/0076; G01C 13/008; G01C 13/004; G01S 15/88; G01S 15/08;
(Continued)

(56) References Cited

U.S. PATENT DOCUMENTS 5,869,759 A * 2/1999 Seigel ............... G01V 7/16
73/382 R
7,729,880 B1 * 6/2010 Mashburn ............ H04L 41/12
702/151
(Continued)

*Primary Examiner* — Omar Casillashernandez
(74) *Attorney, Agent, or Firm* — John L. Sotomayor

(57) ABSTRACT

A platform, system, method, and computer readable media is provided which is configured for monitoring water level height of one or more bodies of water. In a version the system generally comprises one or more of the following components: (a) a plurality of sensor nodes, each sensor node associated with a predetermined geographical location near water, wherein each sensor node comprises: (i) a detector configured to collect environmental data pertaining to changes in water surface height; and (ii) a telemetry module configured to wirelessly transmit the environmental data collected by the detector; (b) a gateway device configured to receive and route the environmental data, the gateway device comprising a gateway device processor and non-transitory computer readable storage media encoded with a computer program including instructions executable by the gateway device processor to create a gateway device application comprising: (i) a software module configured to receive the environmental data; (ii) a software module configured to apply an algorithm to the environmental data to parse, clean and aggregate environmental data; (iii) a software module configured to wirelessly transmit the environmental data; (c) a cloud based platform configured to support real-time stream processing of sensor node environmental data, the cloud based platform comprising one or more cloud based servers comprising a cloud server processor and non-transitory computer readable storage media encoded with a computer program including instructions executable by the cloud server processor to create a server application comprising: (i) a software module configured to receive the environmental data; (ii) a software module configured to apply an algorithm to the environmental data to determine an environmental trend or condition; (iii) a software module configured to generate an environmental data report comprising environmental trend or condition; and (iv) a software module configured to transmit the environmental data report when certain environmental data parameters exceed predefined thresholds in the form of an alert; and (d) a device comprising a report processor con-
(Continued)

figured to provide a report application comprising a software module configured to receive and display the environmental date report.

23 Claims, 16 Drawing Sheets

(51) Int. Cl.
| | |
|---|---|
| *H04W 4/90* | (2018.01) |
| *H04W 4/029* | (2018.01) |
| *H04W 84/18* | (2009.01) |
| *G01C 13/00* | (2006.01) |
| *G01S 15/88* | (2006.01) |
| *H04Q 9/00* | (2006.01) |

(52) U.S. Cl.
CPC ............... *G08C 17/02* (2013.01); *H04Q 9/00* (2013.01); *H04W 4/029* (2018.02); *H04W 4/90* (2018.02); *H04W 84/18* (2013.01)

(58) Field of Classification Search
CPC ........... H04Q 9/00; G08C 17/02; H04W 4/90; H04W 4/029; H04W 84/18; H04W 4/38; Y04S 40/18; H04L 67/12

USPC ............................................ 340/450; 702/55
See application file for complete search history.

(56) References Cited

U.S. PATENT DOCUMENTS

| | | | |
|---|---|---|---|
| 9,202,252 B1* | 12/2015 | Smith | G06Q 50/06 |
| 10,136,261 B2* | 11/2018 | Shim | G01S 5/0027 |
| 2012/0197555 A1* | 8/2012 | Cheng | G01F 23/02 |
| | | | 702/55 |
| 2013/0306572 A1* | 11/2013 | Potts | E03F 1/006 |
| | | | 210/747.9 |
| 2014/0069186 A1* | 3/2014 | Knowles | G01F 23/2966 |
| | | | 73/290 V |
| 2018/0375680 A1* | 12/2018 | Wright | G01F 25/0007 |
| 2019/0012902 A1* | 1/2019 | Kumar | H04L 67/26 |
| 2019/0122129 A1* | 4/2019 | Alsubai | G06Q 50/06 |
| 2019/0223007 A1* | 7/2019 | Weaver | H04L 12/1886 |
| 2019/0226898 A1* | 7/2019 | Gray, Jr. | H04W 84/18 |
| 2019/0307083 A1* | 10/2019 | Henry | A01G 25/02 |

* cited by examiner

ENVIRONMENTAL SENSOR PLATFORM, SYSTEM AND METHOD

CROSS REFERENCE TO RELATED APPLICATIONS

This application is a U.S. Non-Provisional patent application which claims priority to U.S. Provisional Patent Application No. 62/587,140, filed Nov. 16, 2018 and titled "ENVIRONMENTAL SENSOR PLATFORM, SYSTEM AND METHOD," which is hereby incorporated by reference in its entirety.

BACKGROUND

More than 1 billion people in the world live in low-lying coastal regions susceptible to flooding. In the United States, 130 million people, about 39% of the population, live in coastal and riverine cities and counties. Every year, more people are attracted to living near waterways. Commercial activities mostly related to port, shipping, industry, agriculture, etc. have engendered commercial and employment hubs near waterways that attract increasing numbers of people. Moreover, aside from commercial and employment reasons, people are attracted to coastal and riverine metro areas because they offer residents attractions such as boating, beaches, and watersports. These coastal and riverine areas are typically low-lying and threatened by flooding from proximal large bodies of water such as an ocean, bay, river or lake. Flooding threatens infrastructure, property and people. For example, on the US East Coast alone, tidal flooding threatens more than 7,500 miles of roadway.

Flooding in these can be caused by any of the following factors, and often by a combination of them: a) storm surge b) excessively high tides c) heavy or prolonged rainfall d) strong wind action, such as a nor'easter e) rising rivers and creeks f) snow melt g) burn scars.

Moreover, flood events in these coastal and riverine areas are increasing in frequency and severity due to changes in the environment. Sea levels have been rising around the World over the last 80 years; they will continue to rise at an increasing rate. For example, since 1927, sea levels have risen in Norfolk Va. by an average of 4.5 mm/year. This equates to a 9-inch increase between 1968 and 2018. Scientists forecast an additional 10 to 20-inch increase by 2050. Sea level rise exacerbates tidal flooding and storm surge, as higher water comes further inland, causing deeper flooding.

Storms with excessive wind and rain are becoming more frequent, more severe and more prolonged as weather patterns shift. Warmer seas produce more and stronger tropical storms and hurricanes. Furthermore, urban development means less water is absorbed into nature and is channeled through streets, overwhelming storm drains. As populations in flood-prone areas continue to increase, and flooding becomes more frequent and more severe, people, property and infrastructure will be increasingly impacted by the safety risks and economic losses caused by flooding.

For these reasons, what is desired is a real-time environmental sensing platform, system and method for water level monitoring, reporting and warning platform. The platform, system and method monitor rising water levels throughout a given geographical area, which provides real-time and trending data on flooding.

SUMMARY

A platform, system, method, and computer readable media are provided which is configured for monitoring water level elevation at one or more geographical locations.

In a version of the application, the platform, system, method, and computer readable media otherwise known as the environmental sensor network generally comprises A platform for monitoring water level elevation at one or more geographical location, the platform comprising: a plurality of sensor nodes, each sensor node associated with a predetermined geographical location, wherein each sensor node comprises: an environmental detector configured to collect environmental data pertaining to changes in water level elevation; and a telemetry module configured to transmit the environmental data collected by the environmental detector; a cloud platform configured to support real-time stream processing of sensor node environmental data, the cloud platform comprising one or more cloud servers comprising a cloud server processor and non-transitory computer readable storage media encoded with a computer program including instructions executable by the cloud server processor to create a cloud platform application comprising: a software module configured to receive and ingest the environmental data; a software module configured to apply an algorithm to the environmental data to determine an environmental trend or condition; a software module configured to transmit an alert notification when certain environmental trends or conditions exceed predefined thresholds.

In certain versions of the application, the environmental sensor network may further comprise an external client device comprising an external client device processor configured to provide a software module configured to receive and display either the environmental data report or the alert notification. For example, the external client device may be an external computer systems, social media, cellular phone, a smartphone device, a tablet, or a smart watch, and external systems among others.

In a certain version, at least one sensor node further comprises: a data collection module, the data collection module comprising a processor and non-transitory computer readable storage media encoded with a computer program including instructions executable by the processor to create a data collection module application comprising: a software module configured to receive and format the environmental data into a message operably configured for transmission; and a software module configured to wirelessly transmit the environmental data via the telemetry module.

In other versions, the cloud platform may further comprise a software module configured to manage the plurality of sensor nodes; a software module configured to store the environmental data; a software module configured to generate an environmental data report comprising the environmental trend or condition; and/or a software module configured to transmit the environmental data report.

As an example, the environmental data reports may comprise information related to current water level elevation and conditions, water level elevation rate of change over time, trending water levels, water level elevation history, water surge conditions, or regional graphical trends.

In certain versions, the detector comprises a non-contact water level sensor. In yet other versions the detector is an ultrasonic sensor which measures the distance between the sensor and the surface of the water.

In a version of the application, the sensor data collection module further comprises a software module configured to periodically transmit the environmental data at a predetermined rate via the sensor telemetry module.

In a version, the cloud platform further comprises a software module configured to normalize the environmental data received from each sensor, the normalizing comprising removing erroneous data, adding a date and time stamp, adding geolocation data and/or the assignment of the event to a customer domain.

In yet another version, the environmental condition or trend at one or more node sensors in a geographical area comprises: current water level elevation, change in water level elevation, history of water level elevation, rate of water elevation change over time, water level elevation compared to historic potential, comparison of water level elevation at a first location with that of a second location within a geographical region, trends of a plurality of conditions, correlation of a plurality of conditions.

In a version, the alert notification report comprises information related to current water level conditions, trending water levels, areas that are flooding, water surge conditions, and/or regional graphical trends.

In certain versions of the application, the sensor telemetry module is configured to transmit the environmental data to the software module configured to receive the environmental data.

In yet other versions, the sensor telemetry module is configured to transmit the environmental data to a communication protocol infrastructure, the communication protocol infrastructure comprising an input telemetry module configured to receive the environmental data from at least one of the plurality of sensor nodes; and an output telemetry module configured to transmit the environmental data to the cloud platform software module configured to receive the environmental data.

These and other features of the present invention will become readily apparent upon further review of the following specification and drawings.

BRIEF DESCRIPTION OF THE DRAWINGS

These and other features, aspects, and advantages of the present invention will become better understood with regard to the following description and accompanying figures where.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other versions that depart from these specific details. In other instances, detailed descriptions of well-known devices, circuits, and methods are omitted so as not to obscure the description of the present invention with unnecessary detail.

Moreover, the description is not to be taken in the limiting sense but is made merely for the purpose illustrating the general principles of the invention, since the scope of the invention is best defined by the appended claims. Various inventive features are described below that can each be used independently of one another or in combination with other features.

Unless otherwise defined, all technical terms used herein have the same meaning as commonly understood by one of ordinary skill in the art to which the invention belongs. As used in the specification and the appended claims, the singular forms "a," "an," and "the" include plural references unless the context clearly dictates otherwise. Any reference to "or" herein is intended to encompass "and/or" unless otherwise stated.

Figure 1:
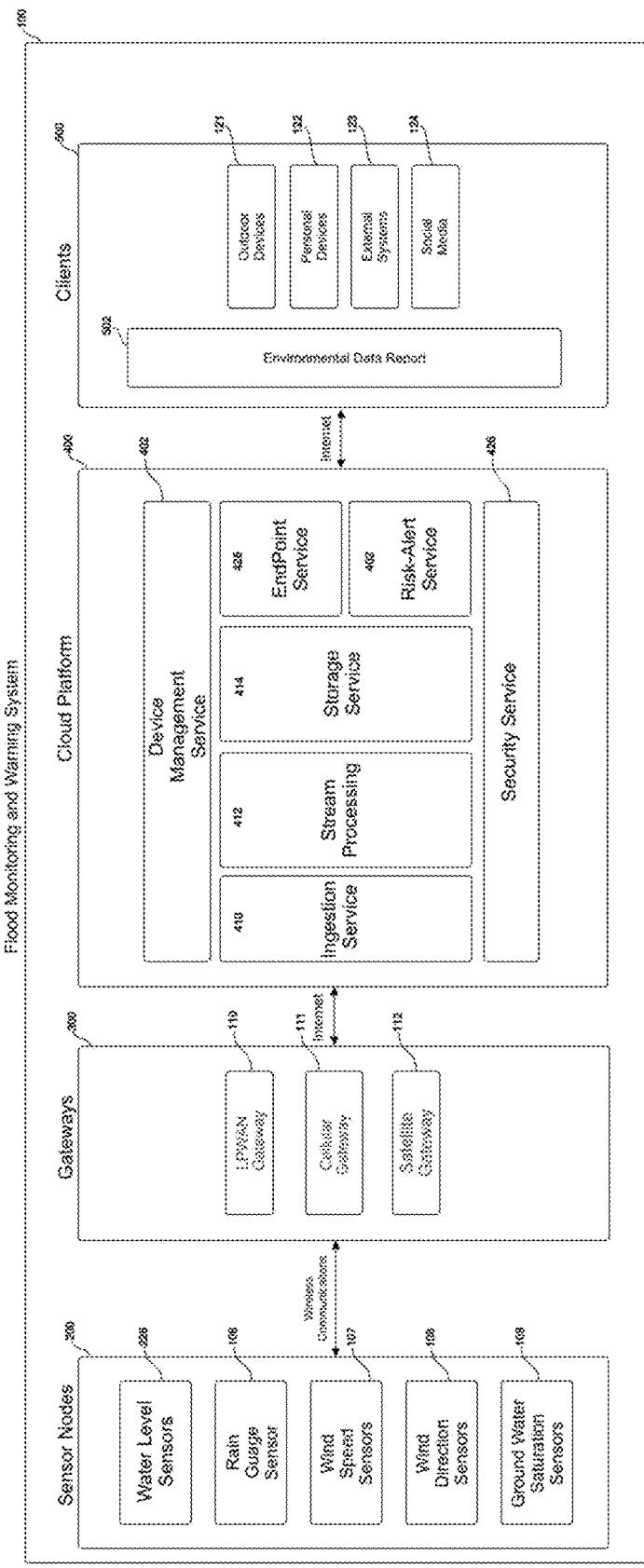
FIG. 1 is a diagram illustrating an example of the environmental sensor network.

By way of overview and in certain aspects as described herein are platforms, systems, methods, and computer readable media which are configured to monitor water levels throughout a metropolitan area or other geographical area located near one or more bodies of water or other areas that are above ground and are prone to flooding such ground and pavement surfaces. For purposes of simplicity, the platforms, systems, methods, and computer readable media for monitoring water levels is defined here on out as the Environmental Sensor Network ("ESN") 100. For example, FIG. 1 shows a non-limiting example version of the ESN 100. In the version, the ESN 100 comprises a network of environmental Internet of Things ("IoT") which is configured to collect and transmit environmental data to a cloud platform for storage, processing, analysis and reporting thereof.

In certain aspects as illustrated by FIG. 1, the ESN 100 generally comprises a plurality of sensor nodes 200 geographically dispersed for collecting and transmitting environmental data; one or more wireless communication protocol infrastructure 300 configured to receive and transmit the environmental data; a cloud platform 400 configured to receive, store, analyze, and support real-time stream processing of the environmental data and generating environmental data reports thereof; and a consumer external device 500 for receiving, relaying and/or displaying report information received from the cloud platform 400.

By way of overview in certain versions, the cloud-based platform 400 is configured to support real-time stream processing of sensor node 200 environmental data and other externally received data in order to derive an environmental data report 502 which is transmitted to certain consumer external devices 500 comprising environmental changes, trends and conditions in predefined geographical areas. Moreover, in certain embodiments, the cloud-based platform 400 utilizes a risk-alert service 402 that is configured to transmit a report or an alert when certain parameters exceed predefined thresholds. For example, emergency alerts can be automatically sent to all citizen's mobile devices 500 in a geographical area if certain parameters, such as water levels exceeding certain heights as an emergency service.

Figure 2:
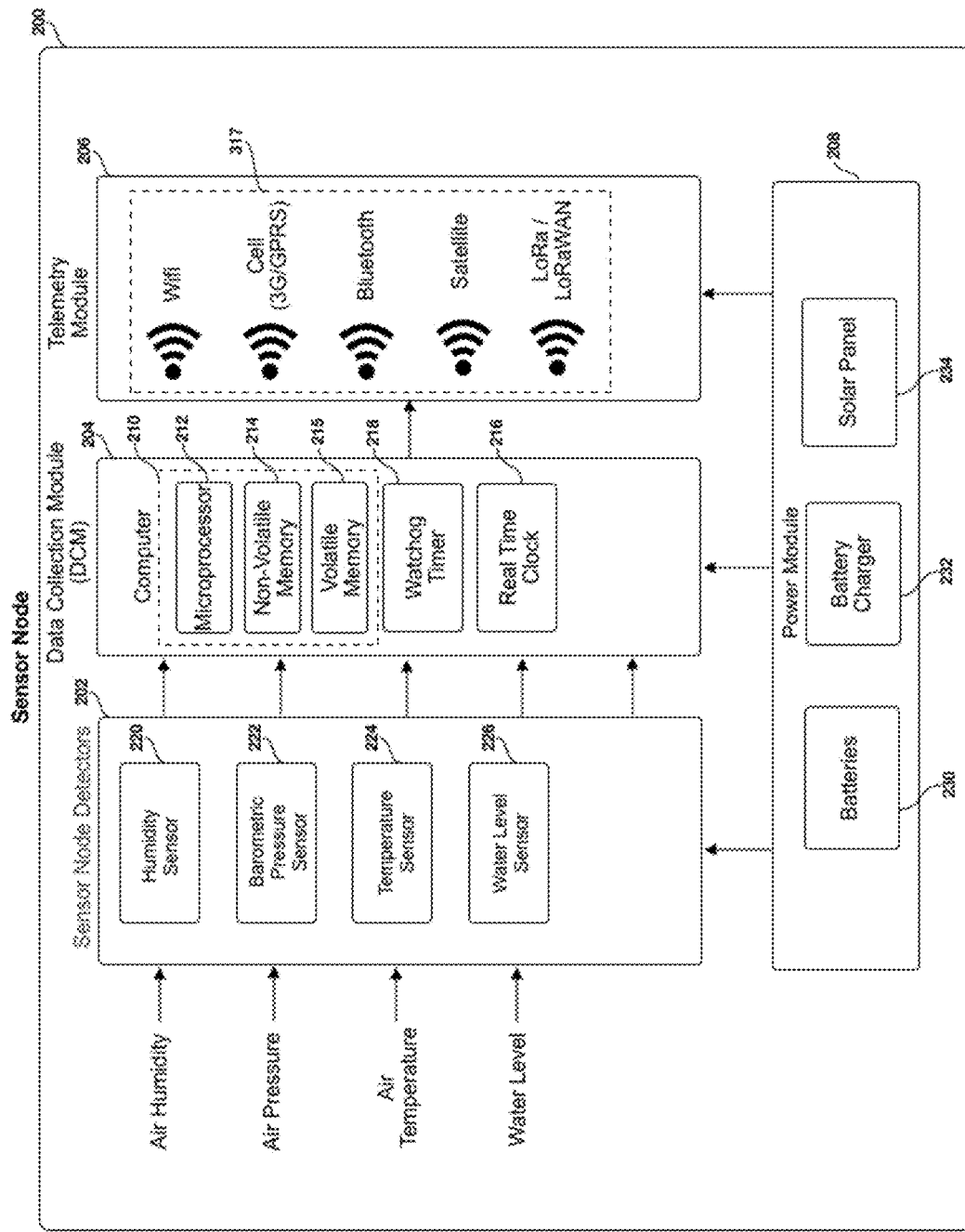
FIG. 2 is a block diagram illustrating an example architecture of a sensor node.
Figure 3:
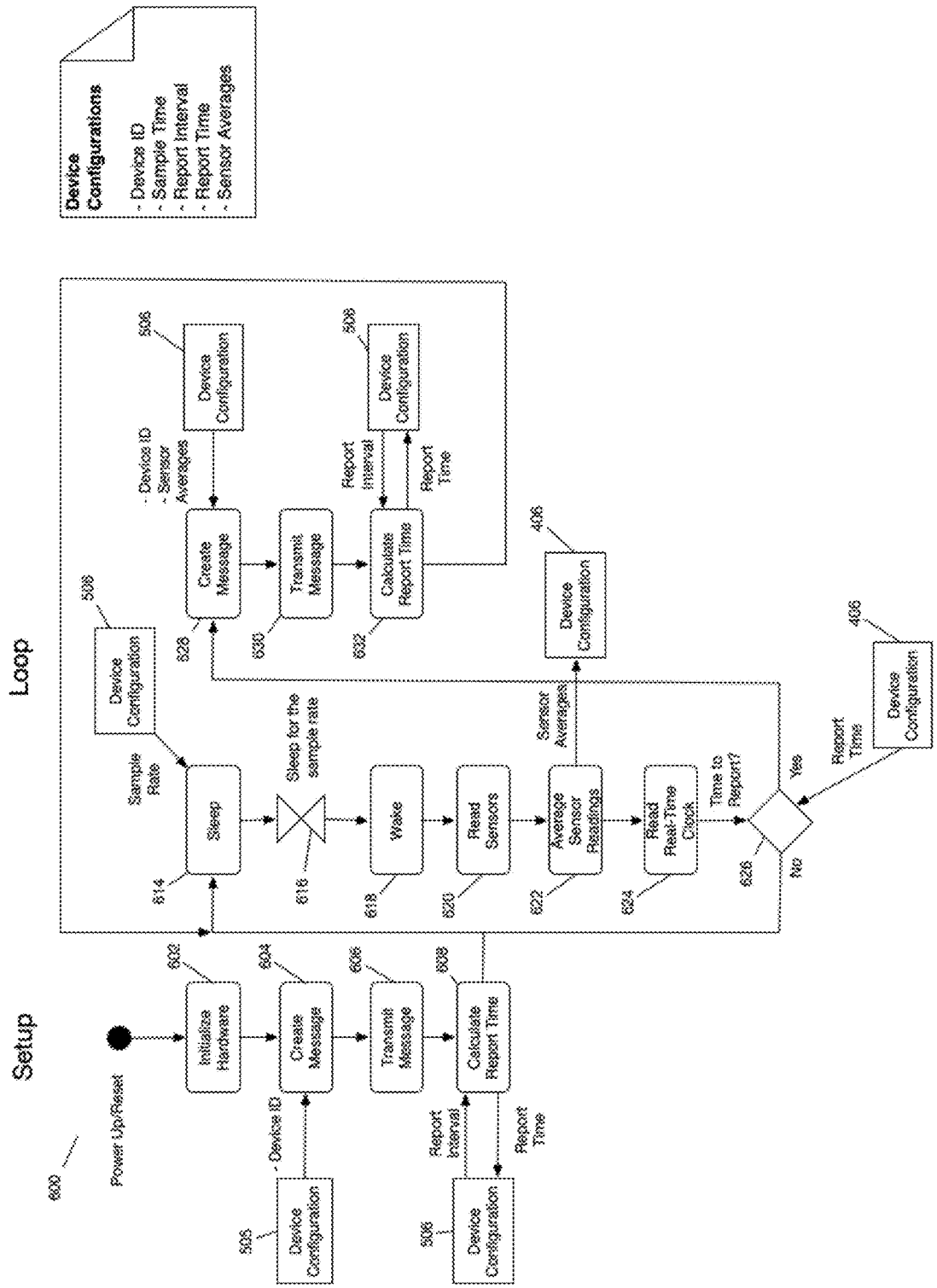
FIG. 3 is a flowchart illustrating an example process performed by the sensor node.

Now referring to FIG. 2, at the periphery of the ESN 100 and at the head of each data stream are a plurality of geographically positioned sensor nodes 200 that are configured to collect and transmit environmental data to produce and transmit environmental data in the form of messages whose final destination and cumulation is the cloud platform 400.

Preferably, the plurality of sensor nodes 200 utilize electronic sensors and micro-controllers to gather environmental data about the adjacent physical environment, package the environmental data by way of messages and transmit the messages wirelessly to the cloud platform 400 by way of a gateway 300. Each sensor node 200 is identified by a unique device identifier—allowing each sensor node 200 to be identified and managed by the ESN 100 and cloud platform 400.

In a version, the sensor nodes 200 generally comprise at least one environmental detector 202 configured to collect environmental data, a data collection module (DCM) 204 for providing computer logic for sensor node 200 operation, a sensor telemetry module 206 configured to transmit the environmental data collected by the environmental detector 202 to the network, and a power module 208 for providing a power source for the entirety of the sensor node 200.

In certain versions, the sensor nodes 200 are designed to be modular and self-contained, whereby the number of sensor nodes 200 can be easily increased or decreased within the ESN 100. Moreover, the sensor nodes 200 may be configured to measure conditions by collecting and transmitting environmental data about their surroundings on a predetermined or at varying periodic time intervals.

In a version of the application, the data collection module 204 ('DCM') comprises a computer 210 having a microprocessor 212 and computer readable medium 214 having programable input/output peripherals which is configured to manage all aspects and function of the sensor nodes 200 as a self-contained system including the environmental detectors 202. In a version, the DCM 204 computer 210 may ideally be an ultra-low power micro controller ("UMCU") designed for embedded applications, the UMCU having one or more processors 212 along with non-volatile memory 214 encoded with instructions as well as a small amount of volatile memory 214 which is used to store environmental data in the event of loss of communications. In a version, the DCM 204 may contain a real-time clock 216 that supports the DCM 204 with the reporting of environmental data at defined time intervals or at a given point in time. For example, the DCM 204 will report environmental data at 6, 12, 18, etc. minutes past the hour. In a version, the DCM 204 may contain a watchdog timer 218 that will reset the DCM 204 in the event of failure.

Moreover, the DCM 204 may be configured to manage the sensor node 200 data collection and transmission as well as manage functional aspects such as determining whether the node sensor 200 is in an active or sleep mode.

In some versions, the sensor nodes 200 can be equipped with one or more varying environmental sensor detectors 202 for gathering environmental data including but not limited to environmental detectors 202 which measure air humidity 220, barometric pressure 222, air temperature 224, and distance 226 between the sensor node 200 and water surface.

Figure 16:
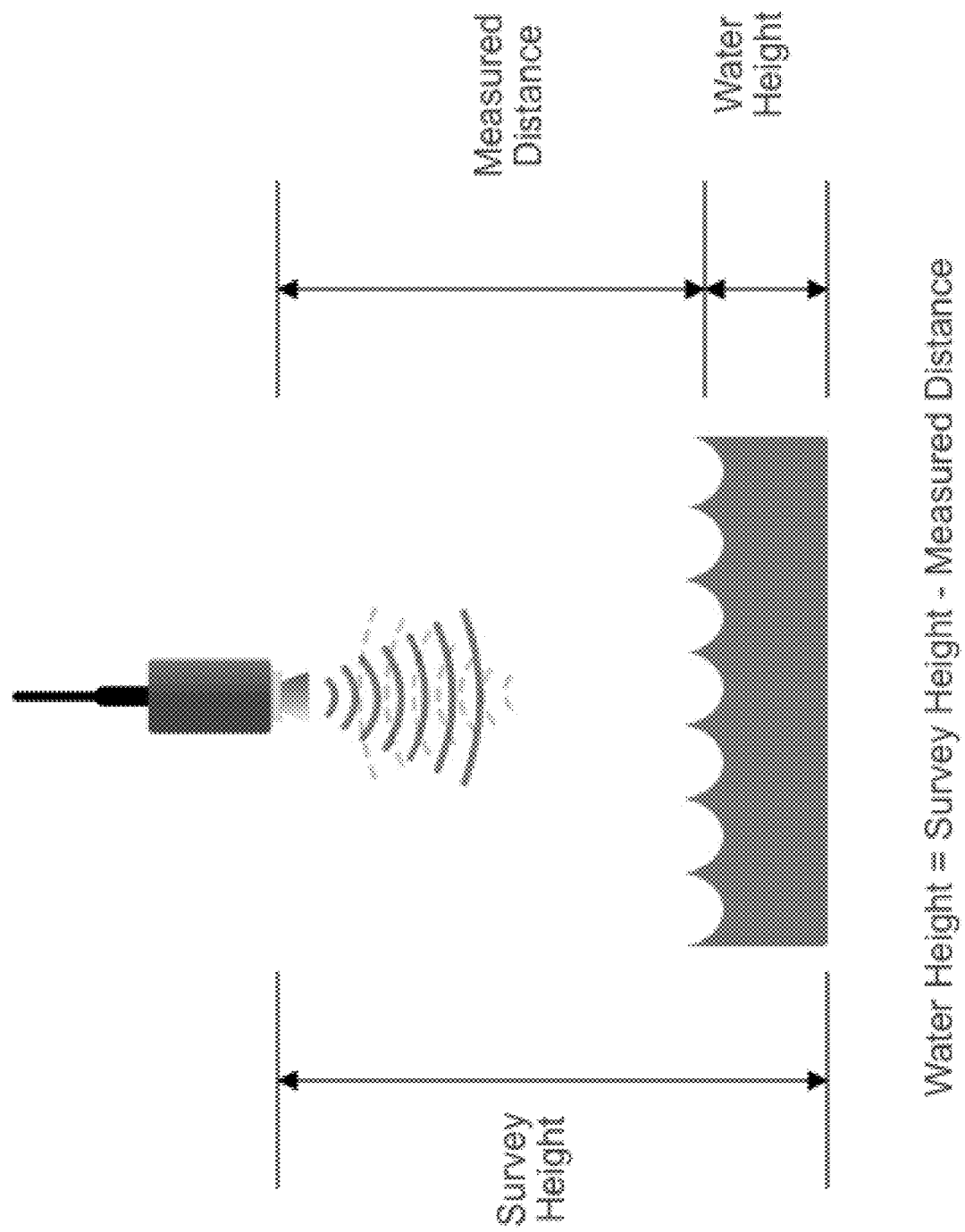
FIG. 16 is an illustrative diagram illustrating an example water elevation sensor providing a measured distance.

As illustrated in FIG. 16, in a version, ideally, one or more of the sensor nodes 200 are geographically positioned near one or more bodies of water or above ground which is prone to flooding. Each individual sensor node 200 is associated with a predetermined geographical location, wherein each sensor node 200 comprises an environmental detector 202 which is configured to collect environmental data pertaining to water level elevation and changes in water level elevation over time at the given geographical location relative to a vertical datum, such a mean sea level (MSL).

In a detailed version, the sensor nodes 200 are operably positioned above the adjacent water surface and the water level sensor 226 is generally configured to measure the distance from the sensor node 200 to the water's surface, determining a measurement of water level elevation when compared to a standard reference datum, zero reference value or defined offset value. The measured distance between the water's surface and the sensor node is compared to the zero-reference value or offset value to indicate change in water level height/depth.

In a version, preferably, the water level detector 226 will use an ultrasonic sensor to measure the distance between the water surface and the sensor node 200. An ultrasonic sensor is an ideal, non-contact approach to detect the elevation of a body of water, providing a means of measuring water elevation in hard to reach locations. Ultrasonic sensors measure the distance from the water level sensor 226 to any object placed in its path by using sound waves. It measures distance by sending out a sound wave at a specific frequency and listening for that sound wave to bounce back. By recording the elapsed time between the sound wave being generated and the sound wave bouncing back, it is possible to calculate the distance between the ultrasonic sensor 226 and the surface of the water.

Preferably, the water level sensor 226, in particular the ultrasonic sensor, may be mounted external or flush with respect to the sensor node 200 housing in order to properly operate and expose the water level sensor 226 to the nearby water surface.

The sensor telemetry module 204 is considered the voice of the sensor node 200 and is responsible for operably transmitting sensor node 200 environmental data to the gateway device 302 or the cloud-based platform 400 via a wireless communication protocol infrastructure 300. The telemetry module 204 may transmit the environmental data to the gateway device 302 or cloud-based platform 400 by way of various forms of wireless communication protocol infrastructure 317, such as transmitting messages via a local Wi-Fi access point, over a low-power wide-area network (LPWAN) such as LoRa/LoRaWAN, over a cellular carrier or general packet radio service (GPRS), satellite carrier, or by way of Bluetooth communication between the sensor node 200 and a mobile device which relays the message to the cloud-based platform 103 via installed computer/mobile application.

In a version, the telemetry module 204 is configured to receive sensor node 200 environmental data from the DCM 204 comprised of sensor environmental detector 202 data. Preferably, the sensor node 200 data is transmitted to the cloud platform 400 in predetermined periodic intervals of time. Ideally, the periodic intervals of time are approximately every six (6) minutes. This frequent periodic rate of transmission ensures timely and accurate data is collected while not overwhelming the communication protocol infrastructure 300, gateway device 302, ESN 100 and/or the cloud platform 400 with repetitive and redundant data measurements.

However, periodic intervals of sampling and transmission may be adjusted via the cloud platform 400. For example, during periods of calm environmental conditions (i.e. no rain or rise in tide), the sample rate may be decreased, thus reducing the transmission rate. The decrease in sample rate helps to reduce power consumption by reducing transmissions, which utilize significant power during the transmission period.

The transmission of the data in a periodic interval fashion also serves as a "ping" or "heartbeat" which indicates that the sensor node 200 is still operating and in communication with the cloud platform 400. This approach provides a means of monitoring sensor node 200 health, ensuring that it is still functioning. For example, if an extended period of time lapses after the last data transmission, such as three times the periodic interval rate, the cloud platform 400 may be configured to determine that the sensor node 200 has failed or has lost communication therewith—and therefore flagging the specific sensor node 200 as non-functional. An automated notification message may also be configured to be transmitted to the ESN 100 and cloud platform 400 administrator.

In a version, a power module 208 is provided which delegates and regulates power to all of the sensor node 200 components including environmental detectors 202, telemetry module 204, and Data Collection Module (DCM) 206. In the illustrated version, the power module 208 provides a power source 228 such as a battery 230 or is wired to an external power source. Ideally, the power source 228 is an array or bank of lithium ion batteries 230 which operably provide electrical power to the sensor node 200.

Preferably, in order to support the sensor node 200 in a self-contained, autonomous manner, the sensor node 200 will preferably utilize a battery charger 232 operably connected to a photovoltaic module otherwise known as a solar panel 234. Preferably, the solar panel 234 is mounted exterior of the node sensor 200 and will operate to provide solar electricity to the batteries 230 by way of the battery charger 232 over time.

Figure 4:
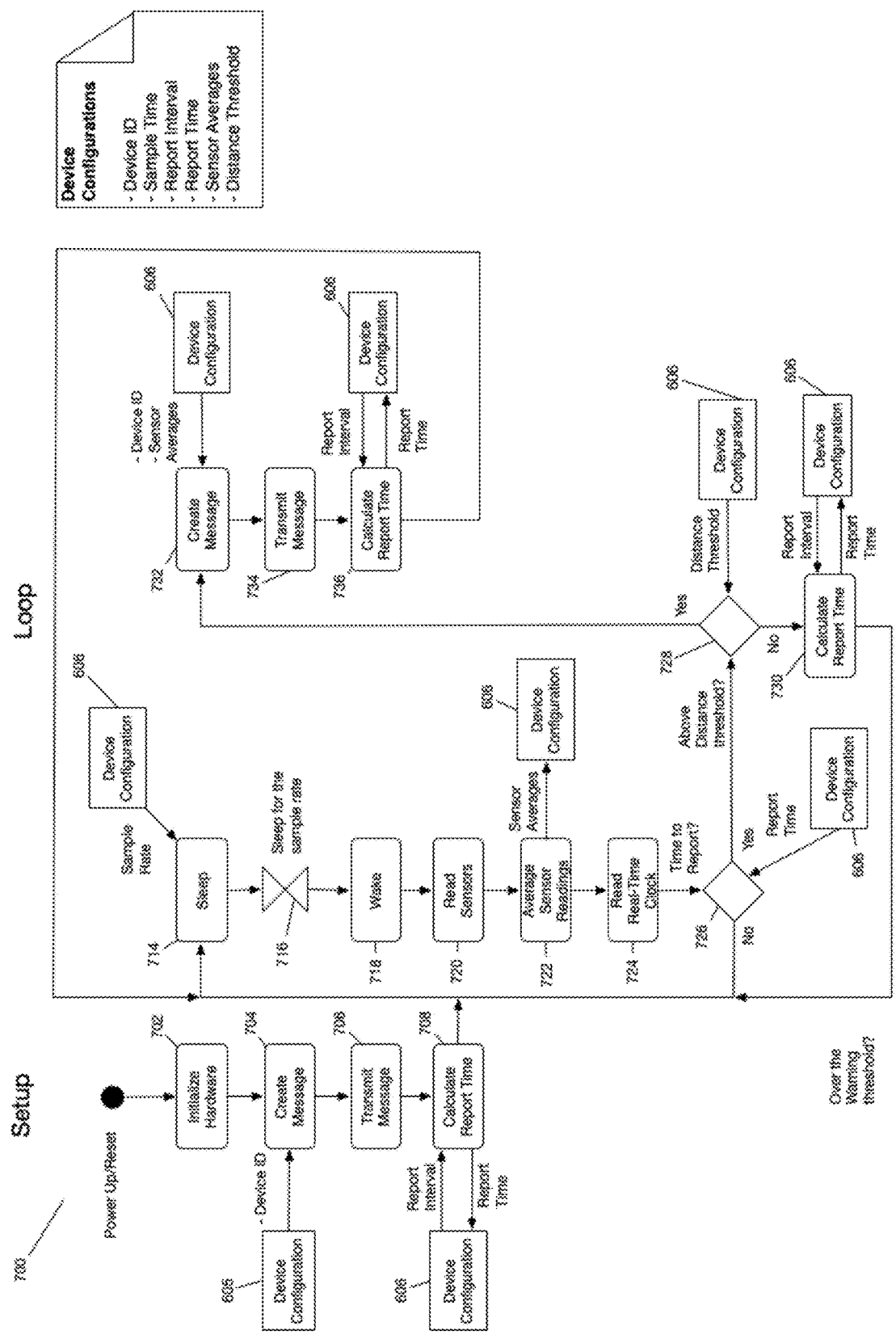
FIG. 4 is a flowchart illustrating an example process performed by the sensor node.

FIG. 4 illustrates a flow diagram of sensor node process 700 for reading and reporting environmental conditions and its surrounding. Process 700 is classified as continuous mode in that the sensor node 200 reports status continually on a regular interval that is based on the report interval configuration parameter.

Process 600 begins in step 602 by initializing the sensor node 200 hardware. The step includes the configuration of the sensor interfaces, the sensor telemetry module, the real-time clock and the watchdog timer. In step 604, process 600 creates a sensor node 200 message in preparation for transmission. This initial message serves to indicate that the sensor node 200 is functioning by sending a message on power up or reset.

The message includes the sensor node's unique device ID, the date and time the message was created and each sensor value. Sensor values may include, but are not limited to, distance, battery voltage, signal strength and temperature. The message is stored in volatile memory 215. In step 606, process 600 transmits the sensor node 200 message. The telemetry sensor module 204 is used by process 600 to broadcast the message via wireless communications. Step 608 of process 600 calculates a future report time. The report time is based on the configured report interval and is calculated by reading the current time from the real-time clock and calculating a future time that is a multiple of the report interval value. The result of step 608 is stored in volatile memory 215. In step 614 of process 600 the data collection module computer 210 is placed into sleep mode. The duration of the sleep mode is defined by the sample time configuration parameter. Placing the DCM 204 computer 210 in sleep mode reduces the power consumption of the computer 210, extending battery 230 life. In step 616 of process 600, the data collection module 206 computer 210 is in sleep mode, the duration defined by the sample time configuration parameter. In step 618, the DCM 204 computer 210 awakens and continues process 600. In step 620, process 600 reads the environmental data of the environmental detectors/sensors 202 included in the sensor node 200. The sensor node 200 may contain multiple sensors to include distance, temperature, battery voltage, and signal strength. The environmental detectors/sensors 202 readings are stored in volatile memory 215. In step 622 process 600 the sensor 202 readings are smoothed by a rolling average algorithm. This averaging serves to smooth the sensor readings, removing any outlier readings or data spikes. In step 624 process 600 reads the DCM real-time clock 216 in preparation for determining when to transmit a sensor message to the cloud platform 400. In step 626 process 600 determines if a sensor message should be transmitted. Step 626 compares the real-time clock 216 value read in step 624 and compares it to the report time configuration parameter. If the values match, the DCM 204 will begin preparing for message transmission. If step 626 values do not match, the DCM 204 computer 210 will return to step 614 and begin a sleep cycle. In step 628, process 600 creates a sensor node 200 message in preparation for transmission. The message includes the sensor node 200 unique device ID, the date and time the message was created and each sensor value. Sensor values may include, but are not limited to, distance, battery voltage, signal strength and temperature. The message is stored in volatile memory 215. In step 630, process 600 transmits the sensor node message. The telemetry module 204 is used by process 600 to broadcast the message via wireless communications. Step 632 of process 600 calculates a future report time. The report time is based on the configured report interval and is calculated by reading the current time from the real-time clock 216 and calculating a future time that is a multiple of the report interval value. The result of step 634 is stored in volatile memory 215. At the completion of step 634, process 600 will return to step 614 and begin a sleep cycle.

Figure 5:
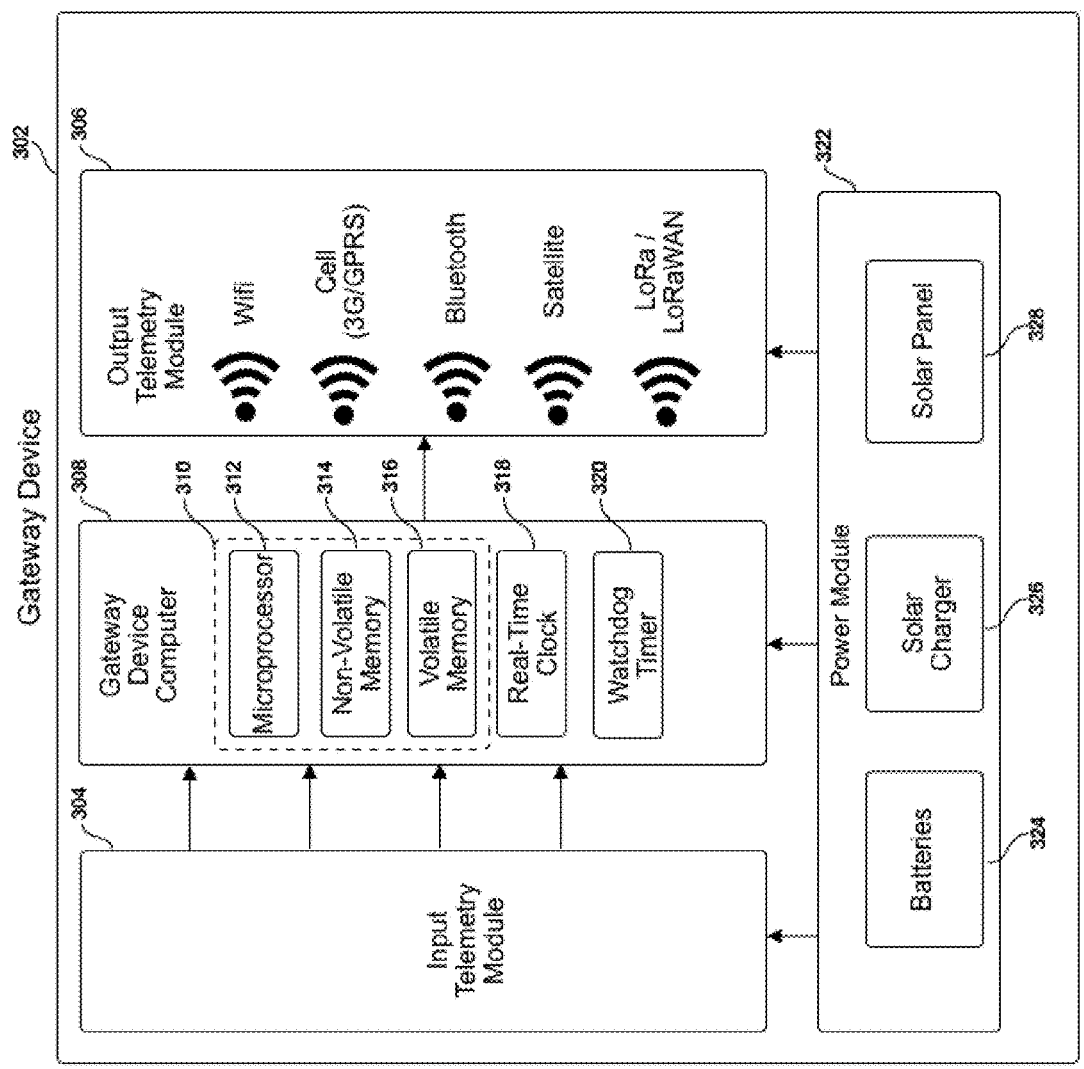
FIG. 5 is a block diagram illustrating the components of an example gateway device.

FIG. 5 illustrates a flow diagram of sensor node process 700 for reading and reporting environmental conditions and its surrounding. Process 700 is classified as threshold mode in that the sensor node 200 reports status on the order of once every 1 to 4 hours and begins transmitting environmental data messages when a threshold value is reach or exceeded.

Process 700 begins in step 702 by initializing the sensor node 200 components/hardware. Step 702 includes the configuration of the sensor interfaces/environmental detectors 202, the sensor telemetry module 204, the real-time clock 216 and the watchdog timer 218. In step 704, process 700 creates a sensor node 200 message in preparation for transmission. This initial message serves to indicate that the sensor node 200 is functioning by sending a message on power-up or reset.

The message includes the sensor node 200 unique device ID, the date and time the message was created and each sensor values. Sensor values may include, but are not limited to, distance, battery voltage, signal strength and temperature. The message is stored in volatile memory 215. In step 706, process 700 transmits the sensor node 200 message. The sensor telemetry module 206 is used by process 700 to broadcast the message via wireless communications. Step 708 of process 700 calculates a future report time. The report time is based on the configured report interval and is calculated by reading the current time from the real-time clock 216 and calculating a future time that is a multiple of the report interval value. The result of step 708 is stored in volatile memory 215. In step 714 of process 700 the data collection module computer 206 is placed into sleep mode. The duration of the sleep mode is defined by the sample time configuration parameter. Placing the DCM 204 computer 210 in sleep mode reduces the power consumption of the computer 210, extending battery 230 life. In step 714 of process 700, the DCM 204 computer 210 is in sleep mode, the duration defined by the sample time configuration parameter. In step 718, the DCM 204 computer 210 awakens and continues process 700. In step 720, process 700 reads the environmental data of the environmental detectors/sensors 202 included in the sensor node 200. The sensor node 200 may contain multiple sensors to include distance, temperature, battery voltage and signal strength. The sensor readings are stored in volatile memory 215. In step 722 process 700 the sensor readings are smoothed by a rolling average algorithm. This averaging serves to smooth the sensor readings, removing any outlier readings or data spikes. In step 724 process 700 reads the DCM 204 real-time clock 216 in preparation for determining when to transmit a sensor message to the cloud platform 400. In step 726, process 700 determines if a sensor message should be transmitted. Step 726 compares the real-time clock value read in step 724 and compares it to the report time configuration parameter. If the values match, the DCM 204 will begin preparing for message transmission. In step 726, if the values do not match, the DCM 204 computer 210, will return to step 714 and begin another sleep cycle. In step 728, process 700 determines if the distance sensor 226 has reached a defined threshold value. This value is a configuration parameter that is set during device setup. If step 728 determines that the distance value has met or exceeds the distance threshold parameter, process 700 will begin preparing to transmit an environmental data message. If step 728 determines that the distance value is below the distance threshold parameter value, it will prepare for another sleep cycle. In step 730, process 700 reads the real-time clock 216 and stores the results in volatile memory 215. Process 700 then returns to step 714 and begins another sleep cycle.

In step 732, process 700 creates a sensor node 200 message in preparation for transmission. The message includes the sensor nodes 200 unique device ID, the date and time the message was created, and each sensor value. Sensor values may include, but are not limited to, distance, battery voltage, signal strength and temperature. The message is stored in volatile memory 215. In step 734, process 700 transmits the sensor node 200 message. The sensor telemetry module 204 is used by process 700 to broadcast the message via wireless communications. Step 736 of process 700 calculates a future report time. The report time is based on the configured report interval and is calculated by reading the current time from the real-time clock 216 and calculating a future time that is a multiple of the report interval value. The result of step 736 is stored in volatile memory 215. At the completion of step 736, process 700 returns to step 714 and begins another sleep cycle.

Referring to FIG. 5, in some embodiments, the ESN 100 utilizes a gateway device 302 as means for communicating and transferring messages between the plurality of sensor nodes 200 and the cloud platform 400. The gateway device 302 is configured as a portal between the sensor node 200 and the cloud platform 400, allowing them to share information and messages by communicating between protocols. In some versions, the gateway device 302 receives data in the form of messages from the sensor node 200, aggregates the data and then transmits the data to the cloud platform 400.

Referring to FIG. 5, in a version of the application, the gateway device 302 generally comprises an input telemetry module 304, an output telemetry module 306, and a gateway data collection module ("GDCM") 308 for providing computer logic for the operation of the gateway device 302.

The input telemetry module 304 is operably configured to receive data from the sensor telemetry module 206. In certain versions, the input telemetry module 304 is utilized by the gateway device 302 to wirelessly receive environmental data from a plurality of sensor nodes 200. In a version, the input telemetry module 304 comprises a LoRa receiver/concentrator which is configured to provide a communication link to and from the sensor nodes 200. The LoRa receiver is configured to provide a local, secure network between the sensor nodes 200 and the input telemetry module 304. For example, all communications in the form of message transmissions area encrypted using Advanced Encryption Standard 128 (AES 128) which encompasses the process of encoding a message or information in such a way that only authorized parties can access.

In certain versions, the gateway device 302 computer 310 is configured to provide processing power which manages multiple communication channels between one or more sensor nodes 200 and the cloud platform 400. The gateway device 302 may be configured to support secure communication between the sensor nodes 200 and the cloud platform 400, for example support for SSL/TLS via HTTPS protocol and LoRaWAN security.

The output telemetry module 306 is responsible for receiving and transmitting communications between the gateway device 302 and the cloud platform 400. Further, the output telemetry module 306 is responsible for operably transmitting sensor device gateway 302 environmental data to the cloud platform 400. The telemetry module 306 may transmit the environmental data to cloud platform 400 by way of various forms of wired and wireless communication protocol infrastructure 300, such as transmitting messages via ethernet, a local Wi-Fi access point, over a low-power wide-area network (LPWAN) such as LoRa/LoRaWAN, over a cellular carrier, satellite carrier, or by way of Bluetooth communication.

In certain versions, the gateway data collection module (GDCM) 308 generally comprises a computer 310 having a microprocessor 312 and non-transitory computer readable medium 314 such as non-volatile memory having programmable input/output peripherals. In a version, the gateway data collection module 308 computer 310 may have one or more processors 312 along with non-volatile memory 314 encoded with instructions/computer program as well as a small amount of volatile memory 316 which is used to store environmental data in the event of loss of communications.

In a detailed version of the application, the GDCM 308 may provide a computer program/software module which include instructions executable by the gateway device processor 312 to create a gateway device 302 application comprising: i) a software module configured to receive the environmental data via the input telemetry; ii) a software module configured to apply an algorithm to the environmental data to parse, add data such as current date and gateway ID, and clean and aggregate environmental data; and iii) a software module configured to wirelessly transmit the environmental data via the output telemetry.

Further, the gateway device 302 software modules executed by the computer 310, may be configured to execute a plurality of components of the device processes, preferably lightweight threads of execution, otherwise known as a sequence of programed instructions that can be managed independently by a scheduler. In the version, each thread may be configured to manage a specific gateway device 302 communication channel. A central process will manage thread communications, passing commands and receiving messages as required to support end-to-end processing.

In certain version of the application, the gateway data collection module 308 may contain a real-time clock 318 that supports the gateway data collection module 308 with the reporting/transmitting of environmental data at defined time intervals or at a given point in time. For example, the GDCM 308 will report environmental data at 6, 12, 18, etc. minutes past the hour. In a version, the GDMC 308 may contain a watchdog timer 320 that will reset the GDCM 308 in the event of failure.

In a version, the gateway device 302 comprises a power module 322 which delegates and regulates power to all of the gateway device 302 modules and components. The power module 322 comprises a power source such as a battery 324 or by way of connection to external power source.

Preferably, in order to support the gateway device 302 in a self-contained, autonomous manner, the gateway device 302 will utilize a battery charger 326 operably connected to a photovoltaic module otherwise known as a solar panel 328. Preferably, the solar panel 328 is mounted exterior of the gateway device 302 and will operate to provide solar electricity to the batteries 324 by way of the battery charger 326 over a period of time.

Figure 6:
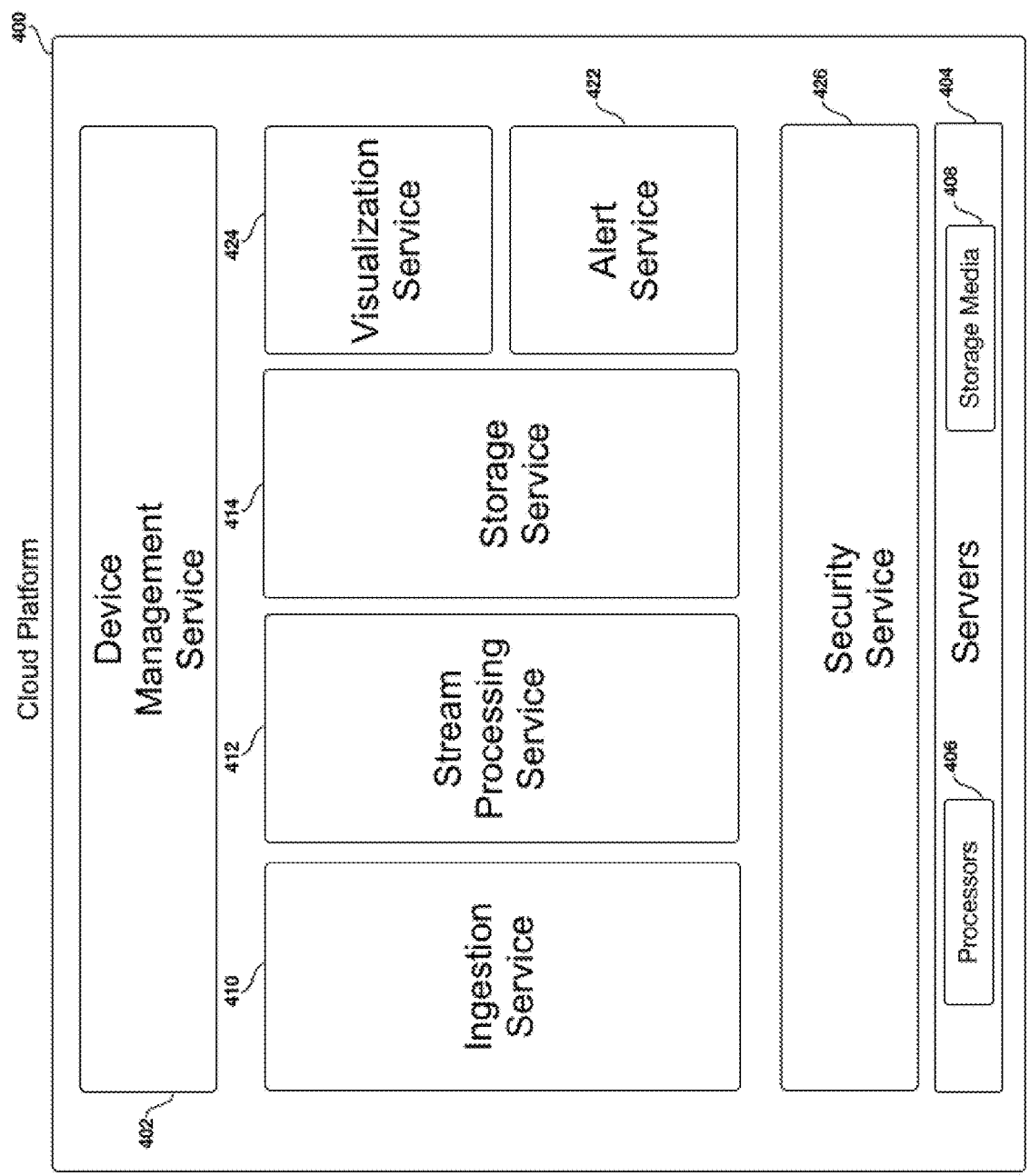
FIG. 6 is a block diagram illustrating the major services of the cloud platform.

Referring to the figures, a version of the ESN 100 cloud-based platform 400 is configured as a back-end as a service (BaaS), which is designed to support real-time stream processing of sensor node 200 environmental data. Generally, the cloud-based platform 400 utilizes multiple services to provide device management, ingestion, transformation, analytics, storage and visualization of the environmental data collected by the plurality of sensor nodes 200. Preferably, as illustrated in FIG. 6, an embodiment of the cloud platform comprises a device management service 402, ingestion service 410, stream processing services 412, storage service 414, visualization service 424, alert service 422, and security service 426.

Ideally, the cloud-based platform 400 is configured to provide 24 hour/7 day a week real-time access to the plurality of sensor node 200 environmental data. Sensor node 200 data can be viewed in real time or in some form of report output visualization to identify trends. Ideally, cloud-based stream processing is utilized to efficiently generate real-time automated alerts transmitted to an external client 500. For example, sent via text message or application notification to a smartphone device, cellular device, tablet, smart watch and/or external computer system or via social media or by email, when specified water-level parameters exceed predefined thresholds.

In some versions, the cloud platform 400 comprises a device management services module 402 which generally includes one or more cloud-based servers 404 comprising a processor 406 and non-transitory computer readable storage media 408 encoded with a computer program including instructions executable by the server processors 406 to create a server application comprising: (i) a software module configured to receive the environmental data; (ii) a software module configured to apply an algorithm to the environmental data to determine an environmental trend or condition; (iii) a software module configured to store the environmental data; (iv) a software module configured to generate an environmental data report comprising environmental trend or condition. For example, the environmental data report may comprise information related to current water level conditions, trending water levels, water surge conditions, and regional graphical trends.

Moreover, the cloud platform 400 may include a software module which is configured to transmit the environmental data report to the external client 500 and transmit data reports and environmental data when certain parameters exceed predefined thresholds in the form of an emergency alert.

Environmental data comes from many sources and in many data formats. Sensor node messages may arrive at the cloud platform directly from a sensor node, pass through a wireless carrier or supporting data imported from external systems. To properly monitor and report flood conditions, the ESN must support the importing and processing of multiple data sources.

Figure 7:
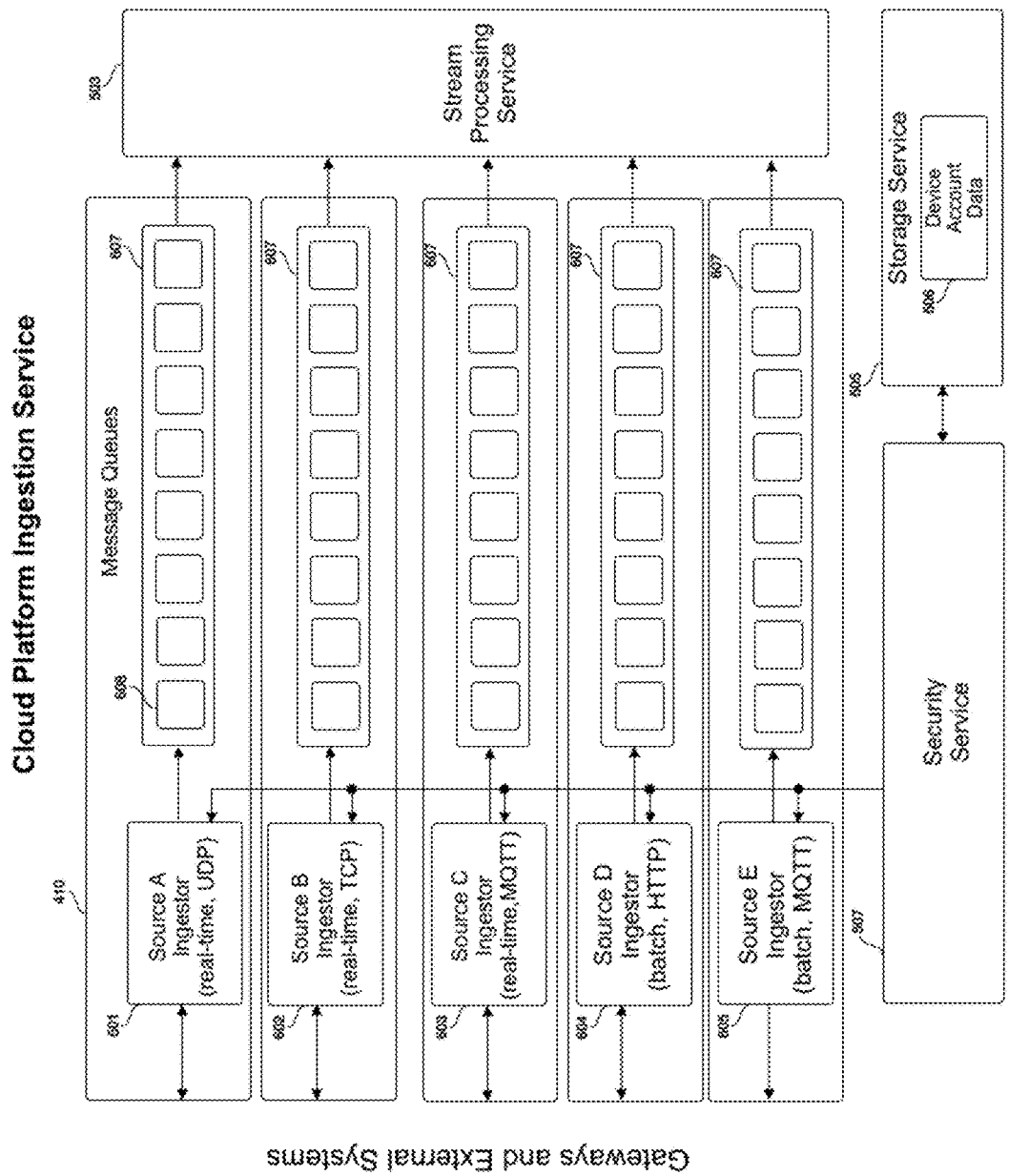
FIG. 7 is a block diagram illustrating an example cloud platform ingestion service.

As illustrated in FIG. 7, in some embodiments the cloud platform 400 may comprise an ingestion service 410 that imports environmental data messages from multiple sources into the cloud platform. The ingestion service supports both real-time and batch importing of environmental data messages. The ingestion service 410 receives sensor node environmental data messages, via a gateway 302, or external data source, and places these messages into one or more messages queue in preparation for real-time processing by the stream processing service 412.

The ingestion service 410 contains multiple data pipelines with each pipeline comprised of a single ingestor and a single message queue. There is a one-to-one relationship between the ingestor and a message queue. Each pipeline handles messages for a given data source and a given data format.

The ingestor is responsible for handling communications between the external data source and the cloud platform 400. The type of ingestor is dictated by the data format of the incoming message and the source communications protocol. For example, if the external data source communicates via TCP, the ingestor is configured to support the TCP protocol. Ingestor communications protocols include UDP, TCP, HTTP, HTTP(s), MQTT and gRPC.

Prior to importing a message, the external data source must authenticate with the cloud platform 400. The authentication process is handled by the ingestor. External data sources send authentication data to the ingestor. This data comes in the form of a username and password or an authentication key. The ingestor receives the authentication data and passes it to the security service 426 for authentication. The security service 426 compares the authentication data to the device's authentication data stored in the storage service 414. If the two data sources match, the security service approves the external data sources request for access.

Once the external data source has successfully authenticated, the ingestor will accept environmental data messages.

As messages are received by the ingestor, they are placed into the associated message queue. The ingestor does not modify the message.

The message queue acts as temporary storage for the messages as well as a rate matching buffer for the stream processing service 412. If data volume exceeds the number of messages the stream processing service can handle, the message queue will buffer the messages tell the stream processing service catches up.

Environmental data messages remain in the queue tell they are extracted by one or more stream processing pipelines.

In batch import mode, the ingestor accesses data from an external data source. Whereas in real-time mode, the ingestor receives messages via push requests, in batch mode the ingestor extracts data from an external data source via pull request. Batch-mode ingestors execute pull request, on a regularly scheduled interval. The ingestor's schedule is configured prior to process to the start of the process. In batch mode, an extactor will receive a packet of data that may contain multiple environmental data messages. The ingestor will split the packet contents into individual messages that are then placed into the associated message queue. Once in the message queue, messages will be processed in a similar fashion to a real-time pipeline.

Figure 8:
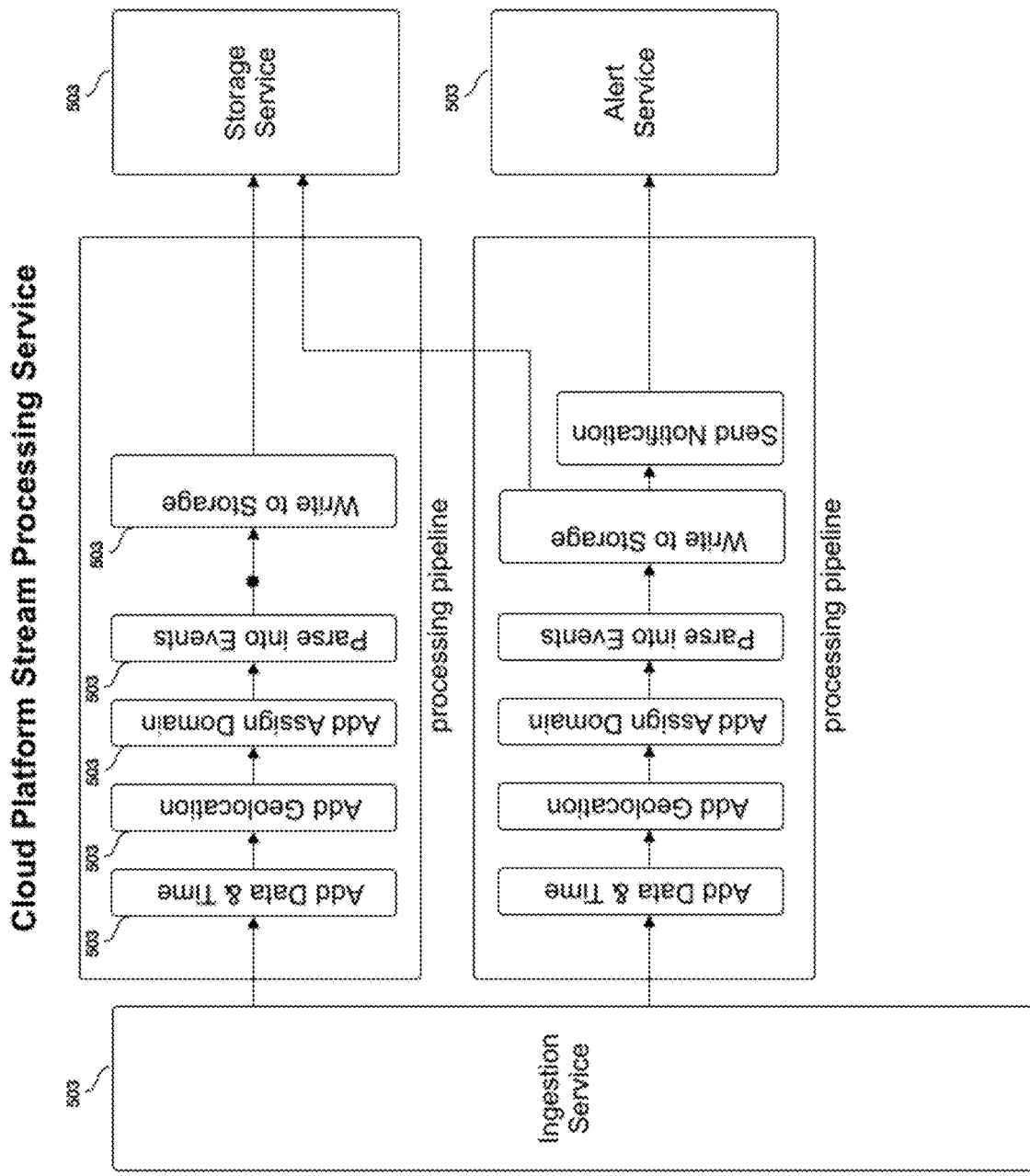
FIG. 8 is a block diagram illustrating an example cloud platform processing service.

As illustrated in FIG. 8, in some embodiments, the cloud platform 400 is configured to support real-time processing of sensor node 200 environmental data. In a version, the cloud platform 400 comprises one or more servers 404 comprising a processor 406 and non-transitory computer readable storage media 408 encoded with a plurality of software modules which are tailored to process and apply algorithms to the sensor node 200 messages. For example, after sensor node 200 messages pass through the ingestion service 410, they are extracted from the ingestion service message queues for processing by the stream processing service 412.

In a version, a stream processing service 412 is configured to normalize the environmental data received from each sensor, the normalizing comprising removing erroneous data, removing outlier data, flagging erroneous data, interpolating missing data, and flagging outlier data.

Moreover, a software module may be configured to apply an algorithm to the environmental data to generate pre-analytic data; the pre-analytic data may comprise events and conditions to which each sensor was subjected. For example, the pre-analytic data comprises water level dynamics comprising one or more of: water level increase, water level decrease, rate of water level change at each sensor node.

In yet another version, a software module may be configured to apply an algorithm to a set of pre-analytic data to generate analytic data, the analytic data comprising trends of a plurality of events, correlations of a plurality of events, trends of a plurality of conditions, correlations of a plurality of conditions, trends of a plurality of events and conditions, or correlations of a plurality of trends and conditions. For example, wherein the analytic data comprises: water level condition, water level rate of change over time, water level heights compared to historic potential, ranking of water level height compared with other sensor locations within a geographical region, tidal movement, or nuisance flooding.

The stream processing service 412 is made up of multiple processing pipelines with each pipeline including a connected set of single purpose software functions that process, transform and undertake analytic tasks on the environmental data messages in real-time.

For example, a stream processor service 412 pipeline may be configured to listen only for special type of message, while another may perform complex message processing in parallel.

At least one stream processing pipeline is associated with an ingestion pipeline. The processing pipeline extracts messages from an ingestion message queue and begins its process.

The following are a list of tasks, functions, and data flows for the stream processing service 412 application pipeline functions:

a) Raw Data Message Storage. The simplest task is reading device messages from the ingestion service and passing them to the storage service 414, saving it to the computer readable storage medium. This data can be used as an archive for raw device data as well as for batch analytics.

b) Transforming messages. Sensor node 200 message data is transformed to another format, for example, converting raw water-level data to a calibrated unit measure of distance.

c) Aggregating data and computing. Sensor data can be combined to add checks, such as averaging data across multiple devices to avoid acting on a single, spurious, device, ensuring that there is actionable data if a single device goes offline. By adding computation to the pipeline, streaming analytics can be performed on the data while it is still in the processing pipeline.

d) Enriching data. Water-level data can be combined with additional environmental data, for use in subsequent analysis. For example, water level distance data can be adjusted due to fluctuations in temperature.

e) Device state. In addition to processing the raw message data, the stream processor can update the "last known value" of sensor nodes. Specific aggregated or pre-calculated values can also be stored in the sensor node registry for easy access by cloud platform services, as needed.

f) Sensor node metadata. In some cases, sensor nodes may send messages indicating changes of their metadata attributes. Typically, those are separated from the general telemetry stream. An event processor can "listen" for those messages and update the device registry as appropriate. An example is a change in configuration for the sensor node.

g) Analytics. A complex event processing function can analyze ingested messages in (near) real time, comparing multiple real-time streams or comparing real-time streams with historical values and models. This enables the detection of anomalies, recognition of patterns over rolling time windows, and the ability to trigger an alert when a specific condition appears in the stream. Alerts are forwarded to the alert service to be handled according to business rules, or can initiate an integration workflow with line-of-business systems directly.

h) Advanced analytics and machine learning. Incoming events can be forwarded to specialized modules for advanced analytics and machine learning. Those can perform large-scale, in-motion analysis and visualizations.

For the ESN 100, at minimum, the stream processing 412 software module algorithms will focus on the injection and storage of raw sensor node 200 data and the monitoring of the data for threshold values or environmental conditions. When a threshold value is found, stream processing 412 will generate alert messages to all registered persons.

In a version, a stream processing service is configured to normalize the environmental data received from each sensor, the normalizing comprising removing erroneous data, removing outlier data, flagging erroneous data, interpolating missing data, and flagging outlier data.

Moreover, a software module may be configured to apply an algorithm to the cleaned environmental data to generate pre-analytic data, the pre-analytic data may comprise events and conditions comprising events and conditions to which each sensor was subjected. For example, the pre-analytic data comprises water level dynamics comprising one or more of: water level increase, water level decrease, rate of water level change at each sensor node.

In yet another version, a software module may be configured to apply an algorithm to a set of pre-analytic data to generate analytic data, the analytic data comprising trends of a plurality of events, correlations of a plurality of events, trends of a plurality of conditions, correlations of a plurality of conditions, trends of a plurality of events and conditions, or correlations of a plurality of trends and conditions. For example, wherein the analytic data comprises: water level condition, water level rate of change over time, water level heights compared to historic potential, ranking of water level height compared with other sensor locations within a geographical region, tidal movement, or nuisance flooding.

[Storage Service]

Figure 9:
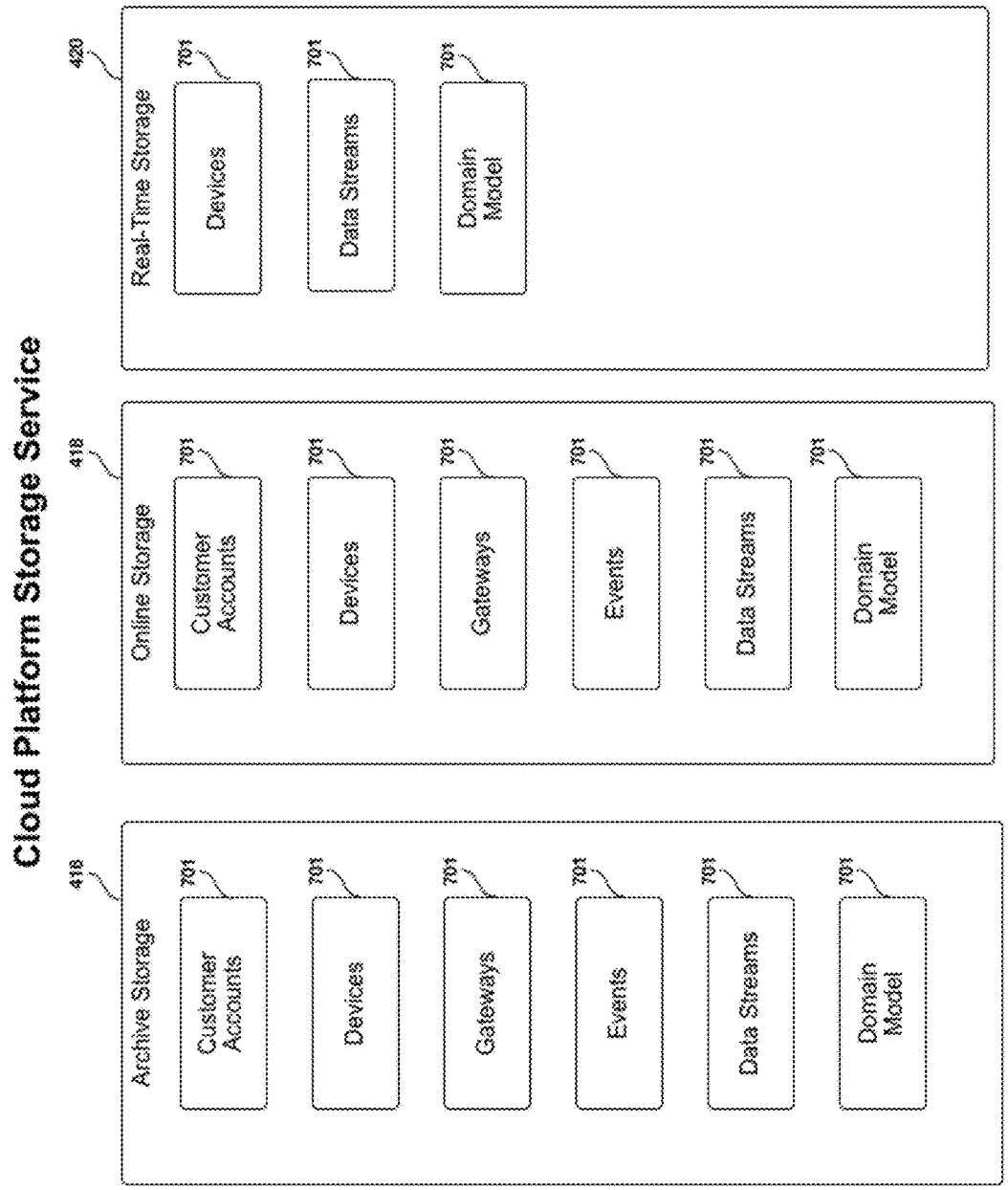
FIG. 9 is a block diagram illustrating an example cloud platform storage service.

As illustrated in FIG. 9, in certain versions, the cloud platform 400 may comprise a storage service 414 which is configured to store messages and supporting data on one or more computer readable storage media 408 received by the ingestion service 410 and processed by the stream processing service 412.

Ideally, the cloud platform 400 comprises a non-transitory computer readable storage medium 408 having low-latency and high durability qualities. Moreover, preferably, the storage service 414 is configured to be scalable, allowing the amount of storage to expand automatically in order to meet storage medium requirements as is needed.

In certain versions, the storage service 414 replicates its data to one or more computer readable media 408 at one or more locations so as to ensure high-speed access to the data from any location. Moreover, providing one or more computer readable media 408 at one or more locations ensures that the sensor node 200 and other data is continuously duplicated and thus backed up. The storage service 414 is configured to enable access of the stored data on the one or more computer readable media 408 by system applications and software modules as is customarily known; however, preferably systems applications and external applications will access ESN 100 messages via storage service 414 queries and REST APIs.

The storage service 414 provides short-term and long-term storage of environmental data messages and supporting data. The storage service 414 is composed of three forms of data storage, namely, archive storage 416, online storage 418 and real-time storage 420.

Archive storage 416 provides long-term storage for data messages and supporting data. Archive data sets may include data for customer accounts, devices, gateways, environmental events, data streams and customer domain models. Archive storage 416 provides support for tasks that do not require real-time access or fast response queries such as data analysis and data visualization. Data in archive storage has an unlimited lifespan.

Online storage 418 provides mid-term storage for use by online processes. Online processes include endpoint service 428 APIs and the device management tools. Data in online storage will have a limited lifetime with the online storage holding no more than one year's worth of data.

Real-time storage 420 supports the reporting of environmental data in real time. Stream processing pipelines deposit messages into the real-time data storage streams. External clients 500 such as smartphones, tablets, desktop applications, external devices and external systems register with a given stream for real-time updates. The endpoint service 428 forwards data stream messages to all registered clients 500.

Figure 10:
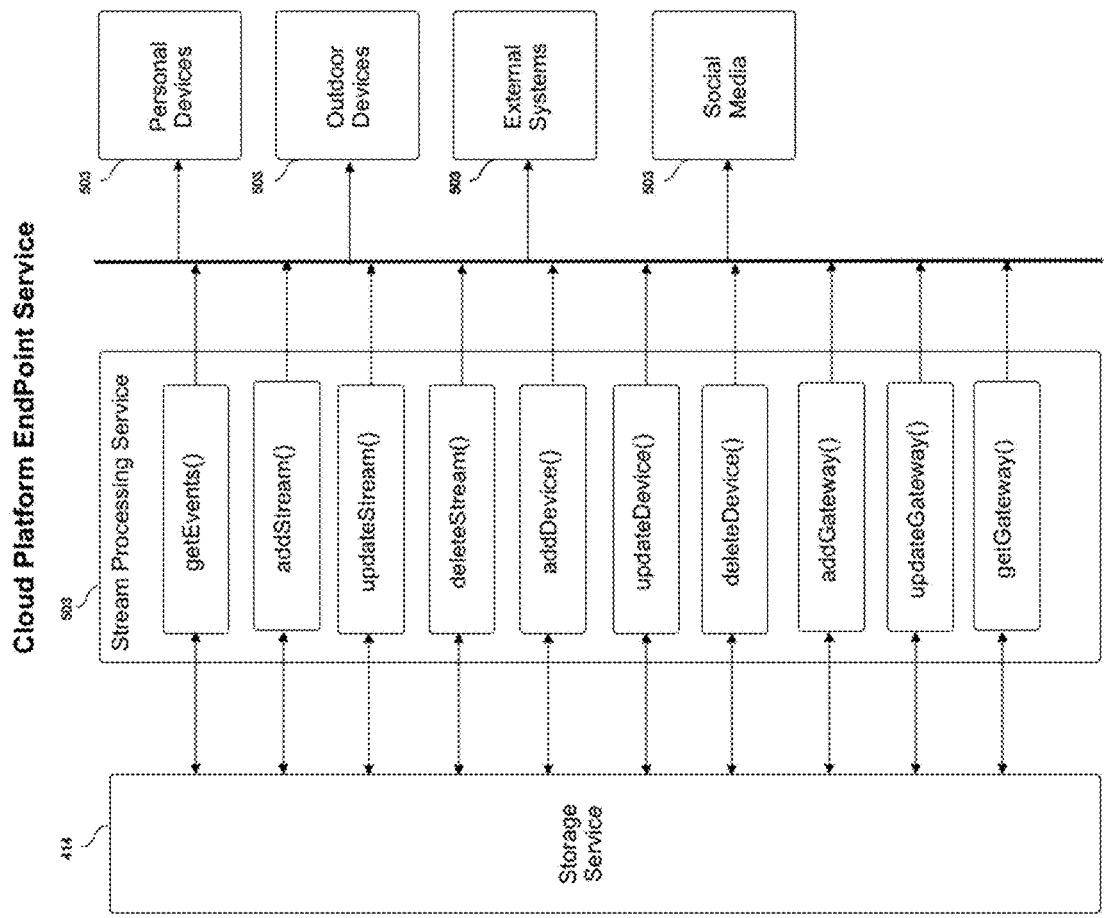
FIG. 10 is a block diagram illustrating an example cloud platform endpoint service.

As illustrated in FIG. 10, in certain versions, the endpoint service 428 provides access to cloud platform 400 data for external client 500. External client devices 500 include outdoor devices, personal devices, external systems and social media sites. The endpoint service 428 is configured to execute and run software modules designed to manage data stream processing and the access of water level and environmental data. External client devices provide an external client device processor configured to provide a software module configured to receive and display either environmental data reports or the alert notifications.

In certain versions, the visualization service 428 module comprises software modules that manage the cloud platform 400 services. The cloud platform 400 endpoint service 428 module is configured to execute and run software modules designed to manage data stream processing and the access of water level and environmental data.

Cloud platform 400 data access can be either batch mode or real-time. For batch mode, the endpoint service 428 exposes RESTful APIs for external clients 500 to access environmental data messages and supporting data.

Clients 500 must successfully authenticate prior to accessing cloud platform 400 data. The endpoint service 428 manages the authentication process in cooperation with the security service 427. Clients 500 include an authentication key in the header of the API request. If the authentication key is associated with a valid account, the endpoint service 428 executes the API request. If the authentication key is invalid, an error message is returned to the client 500 indicating that access has been denied.

Once authenticated, the endpoint service 428 processes the API request and returns a dataset whose contents are based on the API request query parameters. The endpoint service 428 accesses data for API requests from the storage service 414 online storage.

In real-time mode, the endpoint service 428 provides cloud platform 400 data via real-time pushes to registered clients 500. External clients 500 must first register for a given data stream. Similar to batch mode, clients 500 must provide an authentication key as part of the registration process. If successfully authenticated, a real-time data pipeline, in the form of a websocket, is established between the client 500 and the cloud platform 400. The endpoint service 428 will push stream data to all registered clients 500 in real time as it is received.

In some versions, the cloud-based platform 400 will be configured to provide an application that comprises a software module which is configured to apply an algorithm to the environmental data to determine an environmental trend or condition and/or a software module which is configured to transmit the environmental data report when certain parameters exceed predefined thresholds.

In a version, the cloud platform 400 includes an alert service 430 that acts as a broadcast service to send alert messages to the general public. Messages are broadcast to outdoor devices, personal devices and social media.

When the stream processing service 412 determines that a sensor node's 200 water level has exceeded a defined threshold, it will send a publish request to the alert service 430. The request contains a severity level, message content and optionally an image and geolocation data. The alert service 430 will format the message to meet the needs of the data feeds, and then publish the message. For outdoor devices such as roadway signs or cross gates, the alert message will be structured in a format, such as JSON, that can easily be read and processed by the device.

For personal devices such as desktop, smartphones or tablets, alert messages are in the form of in-app alert notifications. This form of alert is only available to clients who install the accompanying application.

The alert service 430 will post alert messages to multiple social media site. For example, alert messages can be posted to Facebook, Twitter, Instagram, LinkedIn and WhatsApp. In each form of social media, the alert may contain a textual message, an image of the flooded area, and the depth of the water.

The cloud platform 400 and environmental sensor network 100 authorization and authentication is based on per-device identities and access credentials and permissions that may be revoked in case of sensor node 200 misuse.

In certain versions, the cloud platform 400 may further comprise a security service 426 module configured to manage all aspects of security for the ESN 100 to include device, gateway and customer authentication and authorization. In particular, the security service 426 is designed to protect potential sensitive information and message data, and to prevent the possibility of data breach and tampering by unauthorized third parties.

For example, sensor node 200 data messages transmitted to the gateway device 302 are preferably encrypted using the AES 128 encryption scheme. Data messages transmitted from the gateway 302 to the cloud platform 400 will be encrypted to support transmission to the cloud platform 400.

In certain versions, upon bootup, the gateway devices 302 will be configured to be first authenticated by the cloud platform 400 before the gateway device 302 will be authorized to exchange data with the cloud platform 400. Preferably, all data flowing through the cloud platform 400 will follow an at rest, in motion encryption scheme.

For sensor nodes 200 and gateways 302 that connect directly to the cloud platform 400, the ingestion service 410 utilizes the security service 426 to authenticate the devices. These devices are required to authenticate prior to data transmission. If authorization is not granted, the ingestion service 410 will reject any incoming messages from the unauthorized device. Device authorization is based on a username and password or authentication key. Both forms are provided to the device administrator for inclusion in the device configuration parameters.

For customers utilizing the network management portal, the security service 426 authenticated the customer during the login process. Customer must first login to the network management portal prior to accessing and managing their portion on the ESN network 100. Customers are provided a username and password for use during login. During the login process, the username and password are passed to the security service 426 for authentication. If the username and password match a registered customer account, the client is granted access to the portal. If the username and password do not match a registered customer account, the security service denies access and an error messages is reported to the client.

For customers who desire to access the cloud platform 400 data via a RESTful API interface, the security service 426 will authenticate API request prior to returning a dataset. The API request contains an authentication key in the header of the request. If the key matches a valid customer account, access is granted, and the API request is processed. If the key is invalid, access is denied and the endpoint service 428 returns an error message.

In some versions, the cloud platform 400 may comprise a device management service 402. The device management service 402 manages all aspects of the ESN 100 to include sensor node 200 and gateway 300 setup and management, stream management and account management. The device management service 402 includes a web-based portal for internal staff and external customers to manage the network. In essence, the device management service 402 handles the device inventory the ESN 100.

Senor nodes 200 and gateways 302 are configured, and their state managed, through the device management service 402. Configuration includes the addition of a device on the network 100, the update of device data, the de-activation of a device and the assignment of a device to a data stream. In the case of device de-activation, the device's storage record is marked inactive. The record is not removed from storage for historical purposes. The device management service 402 also stores device or gateway 302 state. A device state contains the last known message from the device. Device state is used to quickly determine the condition of the device and can be used if there is a time gap in reporting.

Streams are configured through the device management service 402. Configuration includes the creation of a data stream, the update of stream metadata, the de-activation of a stream and the assignment of a device to a stream. The device management service 402 sends a request to the storage service 414 to create or update a stream. Streams reside in real-time storage in the storage service 414.

Accounts are managed through the device management service 402. The ESN 100 supports device and customer accounts. Device accounts are utilized by sensor nodes 200 and gateways 302 to authenticate through the ingestion service 410. Customer accounts are used to authenticate through the device management portal or the endpoint services 428 API interface. The device management service 402 utilizes the storage service 414 to store device and customer accounts.

In certain aspects described herein with respect to the platforms, systems, methods, and computer readable media, the embodiments may utilize an architecture based on the principle of data streams which represent the flow of data through a network.

Moreover, as environmental data messages are received and recorded by the cloud platform 400, the route of an environmental data message may vary. Stream processing is composed of multiple processing flows that work together to define and shape the data stream, transforming messages to produce different types of output. Also, data streams terminate and emerge in different parts of the ESN 100, based on the type of data processing that occurs. This intermediate processing may be performed "on the fly" as part of stream processing.

Figure 11:
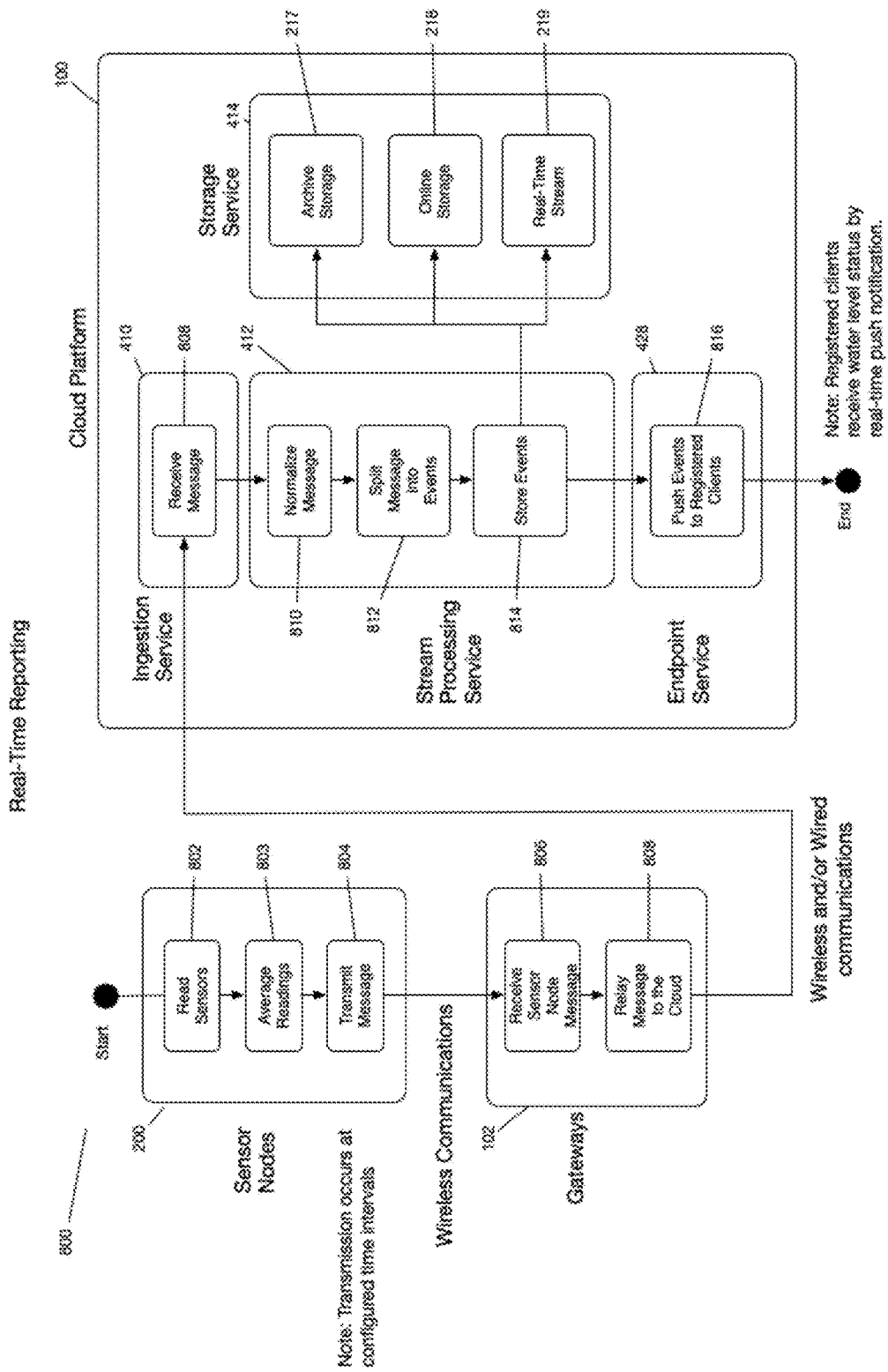
FIG. 11 is a flowchart illustrating an example real-time reporting process performed by an example environmental sensor network.

FIG. 11 illustrates a flow diagram of ESN process 800 for reading and reporting environmental conditions in real time. Process 800 is classified as real-time reporting mode, in that the sensor node 200 reports status at a continuous interval. Process 800 begins with step 802 by reading the sensor node 200 values. In step 802, the sensor node 200 averages the sensor readings so as to remove data spikes and to smooth output. In step 804, the sensor node 200 transmits a message that includes the sensor node 200 unique ID, a timestamp and sensor node 200 readings. The message is transmitted to one or more gateways 302 via a wireless communications protocol.

In step 806, a gateway 302 receives the sensor node 200 message. In step 808, the gateway 302 relays the message to the cloud platform 400 via wireless or wired communications. In a version, the gateway 302 may append, or "wrapper", the sensor node 200 message with additional data. The gateway 302 may append data items such as the gateway ID and a timestamp. The timestamp indicates the data and time the sensor node 200 message was received by the gateway 302.

In step 808, the ingestion service 410 receives the sensor node 200 message, importing it into the cloud platform 400. The ingestion service 410 places the message into a message queue, where it is retrieved by one or more stream processing pipelines. In step 810, the stream processing service 412 normalizes the message by adding a timestamp and geolocation data, and assigning the message to a customer domain. In a version, the message may already contain timestamp and geolocation data. In this case, the stream processing service 412 will make no changes to the message. In step 812, the stream processing service 204 splits the message into discrete environmental events. A message may contain multiple sensor node 200 readings. Step 812 separates these sensor node 200 readings into individual event records, with each record containing a single sensor node 200 reading. Each event record will contain the timestamp, geolocation, and assigned domain or the original message. In Step 814, the stream processing service 412 stores the event records via the storage service 414. Each event record is written to archive storage 416, online storage 418, and a real-time stream 420. Once event storage is complete, step 816 pushes the event records to registered clients 500 in real time. Registered clients 500 include devices such as variable message signs, barriers, flood pumps or flood gates, desktop applications or external customer systems.

Figure 12:
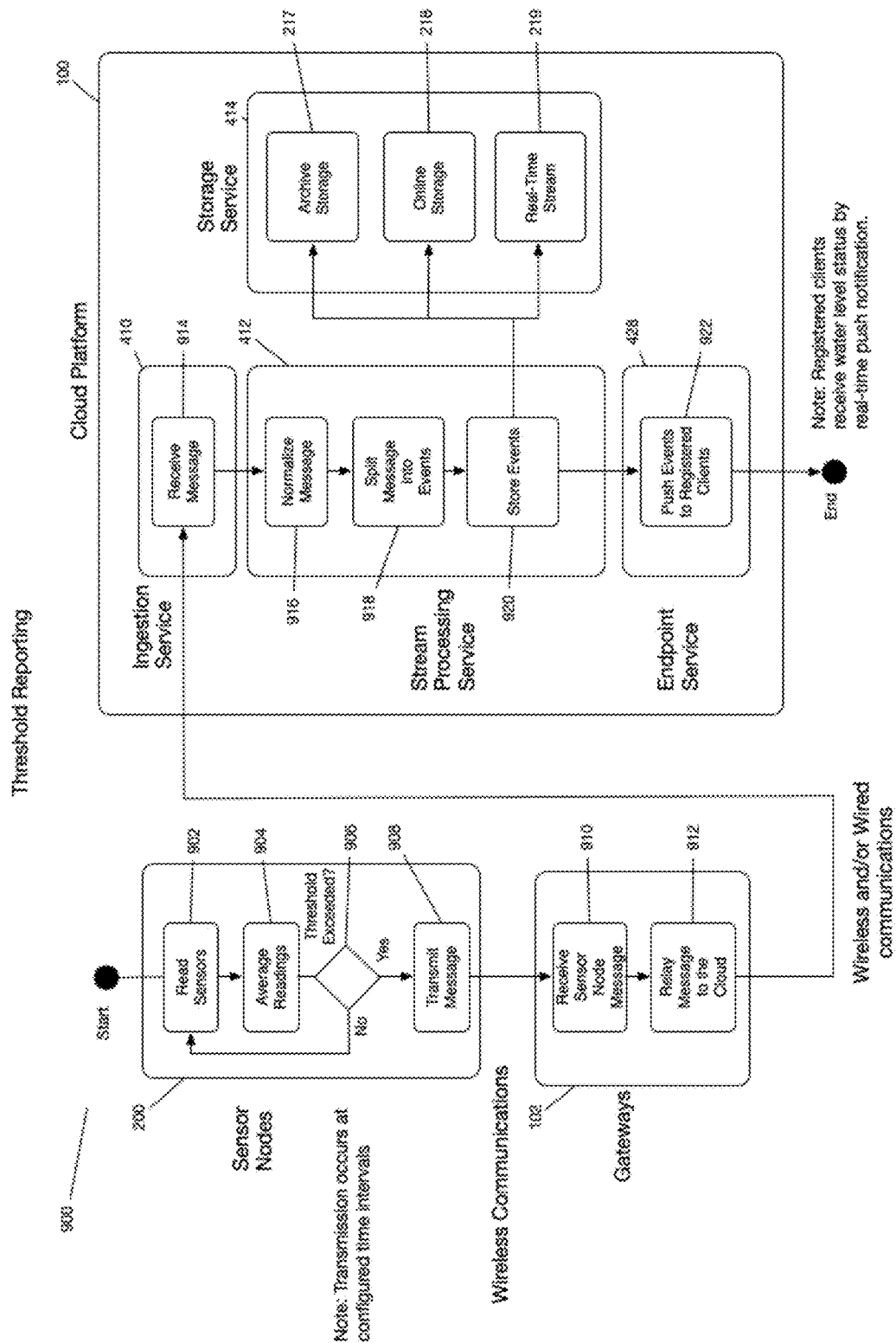
FIG. 12 is a flowchart illustrating an example threshold reporting process performed by an example environmental sensor network.

FIG. 12 illustrates a flow diagram of ESN process 900 for reporting environmental conditions when defined thresholds are met. Process 900 is classified as threshold reporting mode, in that the sensor node 200 only reports status when water levels exceed a configured threshold. Process 900 begins with step 902, by reading the sensor node 200 values. In step 904, the sensor node 200 averages the sensor reading so as to remove data spikes and to smooth output. In step 906, the sensor node 200 compares the water level distance value to a configured threshold value. If the distance value is above the threshold value, the sensor node 200 executes step 908 and will transmit a message. If the distance value is below the threshold, no message is transmitted.

In step 908, the sensor node 200 transmits a message that includes the sensor node 200 unique ID, a timestamp and sensor node 200 readings. The message is transmitted to one or more gateways 302 via a wireless communications protocol.

In step 910, a gateway 302 receives the sensor node 200 message. In step 912, the gateway 302 relays the message to the cloud platform 400 via wireless or wired communications. In a version, the gateway 302 may append, or "wrapper", the sensor node 200 message with additional data. The gateway 302 may append data items such as the gateway ID and a timestamp. The timestamp indicates the data and time the sensor node message was received by the gateway 302.

In step 914, the ingestion service 410 receives the sensor node message, importing it into the cloud platform 400. The ingestion service 410 places the message into a message queue, where it is retrieved by one or more stream processing pipelines. In step 916, the stream processing service 412 normalizes the message by adding a timestamp and geolocation data, and assigning the message to a customer domain. In a version, the message may already contain a timestamp and geolocation data. In this case, the stream processing service 412 will make no changes to the message. In step 918, the stream processing service 412 splits the message into discrete environmental events. A message may contain multiple sensor node 200 readings. Step 918 separates these sensor node 200 readings into individual event records, with each record containing a single sensor node 200 reading. Each event record will contain the timestamp, geolocation and assigned domain or the original message. In step 920, the stream processing service 412 stores the event records via the storage service 414. Each event record is written to archive storage 416, online storage 418 and a real-time stream 420. Once event storage is complete, step 922 pushes the event records to registered clients. Registered clients 500 only receive event data when the sensor node 200 reports a message that has exceeded the configured threshold. Registered clients 500 include devices such as variable message signs, barriers, flood pumps or flood gates, desktop applications or external customer systems. Step 920 also forwards event data to the notification service 422 for publishing to the public. In Step 924, the notification service 422 transmits notification messages to dashboards, smartphone, tablet applications, and to social media.

Figure 13:
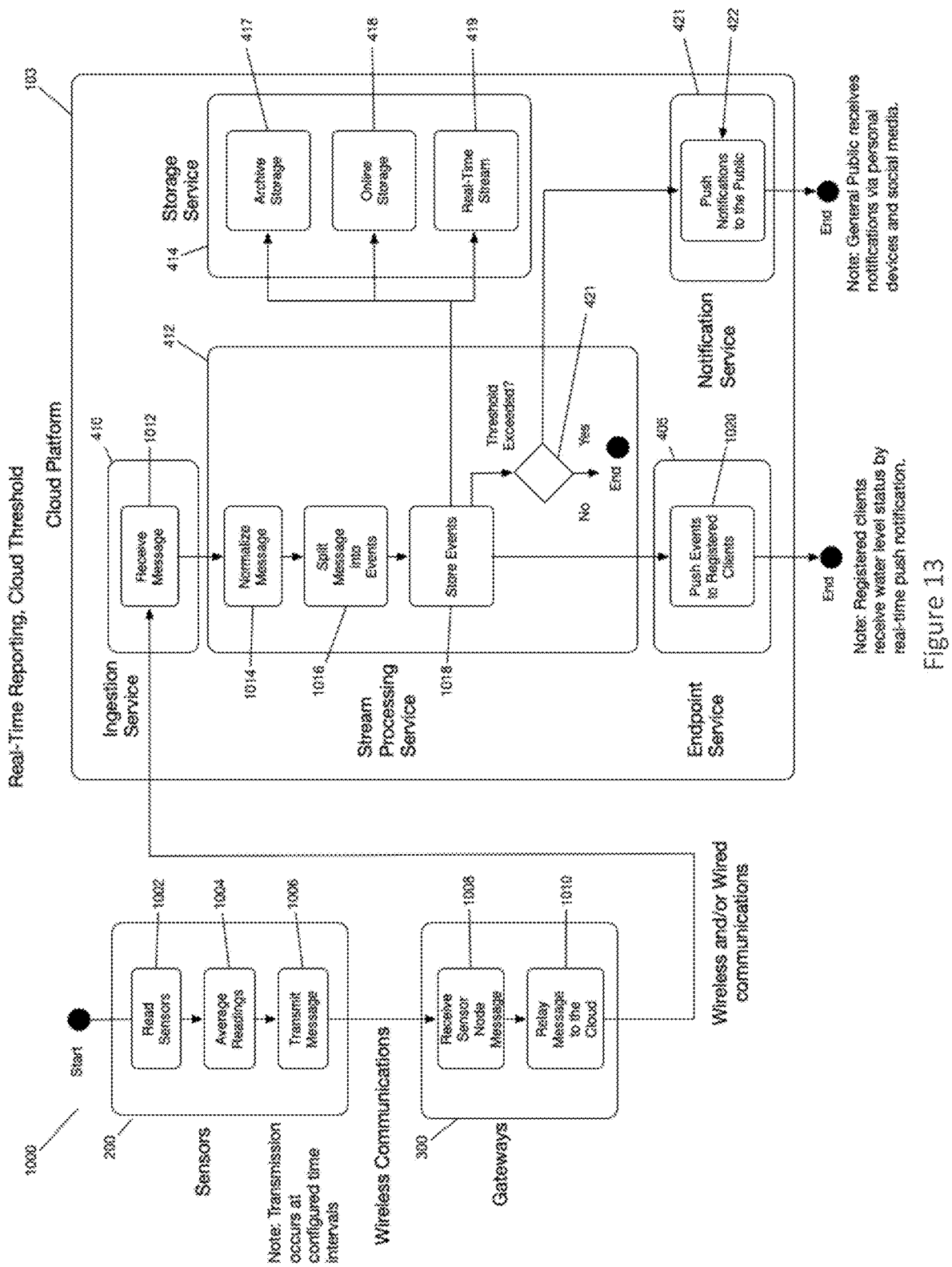
FIG. 13 is a flowchart illustrating an example real-time reporting, cloud threshold reporting process performed by an example environmental sensor network.

FIG. 13 illustrates a flow diagram of ESN 100 Process 1000 for reporting environmental conditions in real time and transmitting notifications when defined thresholds are met. For Process 1000, threshold checks are performed by the cloud platform 400 stream processing service 412. Process 1000 is classified as real-time reporting with cloud threshold mode. In Process 1000, the sensor nodes 200 report in real time, and the cloud platform 400 performs threshold checks. Process 400 begins with Step 1002, by reading the sensor node 200 values. In Step 1004, the sensor node 200 averages the sensor reading, so as to remove data spikes and to smooth output. In Step 1006, the sensor node 200 compares the water level distance value to a configured threshold value. If the distance value is above the threshold value, the sensor node 200 executes Step 1008 and will transmit a message. If the distance value is below the threshold, no message is transmitted.

In step 1006, the sensor node 200 transmits a message that includes the sensor node 200 unique ID, a timestamp and sensor node 200 readings. The message is transmitted to one or more gateways 300 via a wireless communications protocol.

In step 1008, a gateway 300 receives the sensor node 200 message. In step 1010, the gateway 102 relays the message to the cloud platform 400 via wireless and/or wired communications. In a version, the gateway 300 may append, or "wrapper", the sensor node 200 message with additional data. The gateway 300 may append data items such as the gateway ID and a timestamp. The timestamp indicates the data and time the sensor node 200 message was received by the gateway 300.

In step 1012, the ingestion service 410 receives the sensor node 200 message, importing it into the cloud platform 400. The ingestion service 410 places the message into a message queue, where it is retrieved by one or more stream processing pipelines. In step 1014, the stream processing service 412 normalizes the message by adding a timestamp and geolocation data and assigning the message to a customer domain. In a version, the message may already contain timestamp and geolocation data. In this case, the stream processing service 412 will make no changes to the message. In step 1016, the stream processing service 404 splits the message into discrete environmental events. A message may contain multiple sensor readings. Step 1016 separates these sensor readings into individual event records, with each record containing a single sensor reading. Each event record will contain the timestamp, geolocation and assigned domain or the original message. In step 1018, the stream processing service 412 stores the event records via the storage service 414. Each event record is written to archive storage 416, online storage 418, and a real-time stream 420. Once event storage is complete, Step 1020 pushes the event records to registered clients. Registered clients only receive event data when the sensor node 200 reports a message that has exceeded the configured threshold. Registered clients include devices such as variable message signs, barriers, flood pumps or flood gates, desktop applications or external customer systems. Step 1018 also forwards event data to step 1022, which determines if the water level value exceeds a defined threshold. If the threshold is exceeded, Step 421 sends a notification request to notification service 421. In Step 1024, the notification service 421 transmits a notification message to the public. Notifications are sent to personal devices such as smartphone, desktop and tablet applications, external client systems, and social media.

As an example, the environmental data reports may comprise information related to current water level elevation and conditions, water level elevation rate of change over time, trending water levels, water level elevation history, water surge conditions, or regional graphical trends.

In yet another version, the environmental condition or trend at one or more node sensors in a geographical area comprises: current water level elevation, change in water level elevation, history of water level elevation, rate of water elevation change over time, water level elevation compared to historic potential, comparison of water level elevation at a first location with that of a second location within a geographical region, trends of a plurality of conditions, correlation of a plurality of conditions.

In a version, the alert notification report comprises information related to current water level conditions, trending water levels, areas that are flooding, water surge conditions, and/or regional graphical trends.

Figure 14:
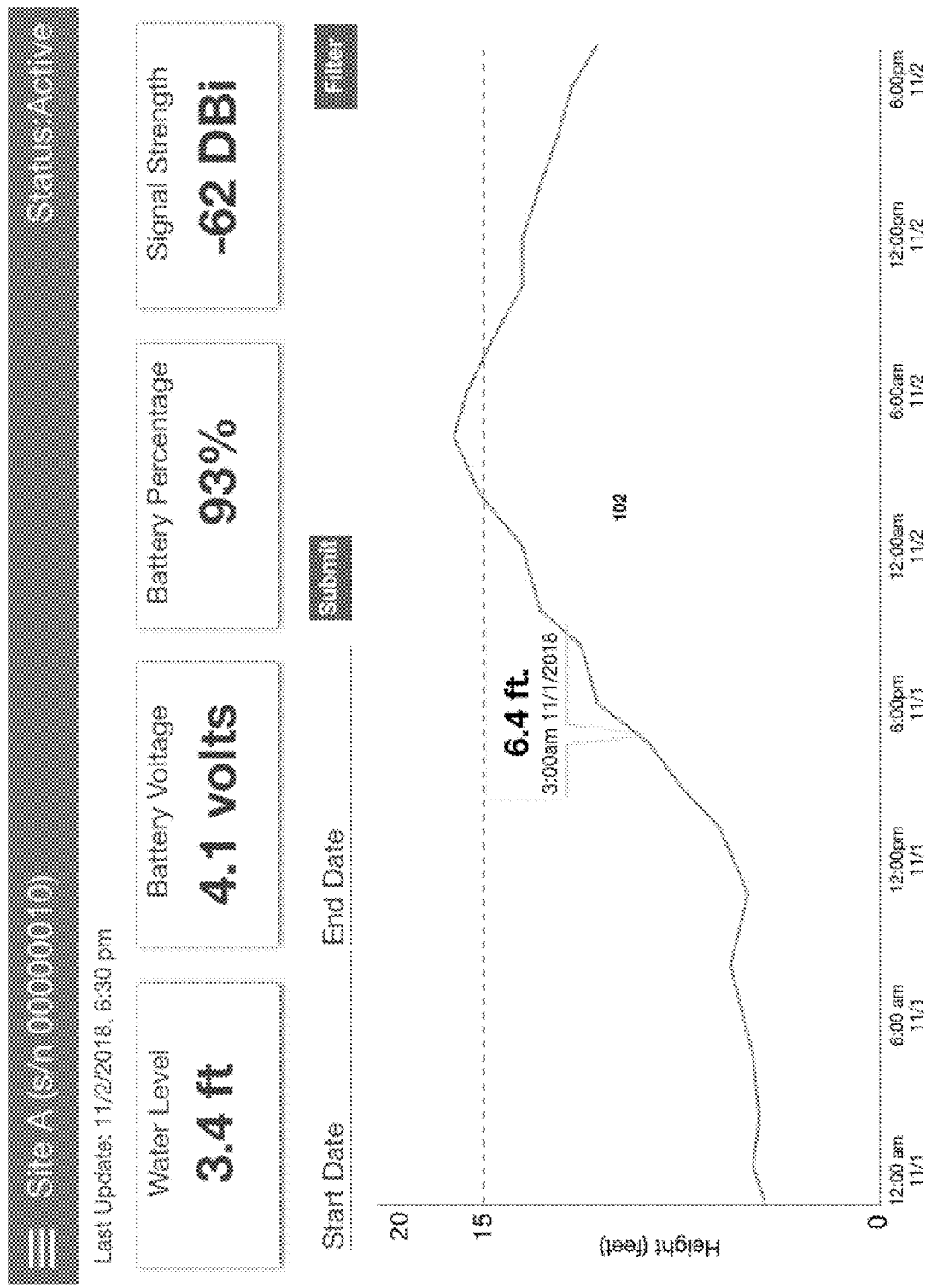
FIG. 14 is an illustrative visual report relating to environmental trends and conditions.
Figure 15:
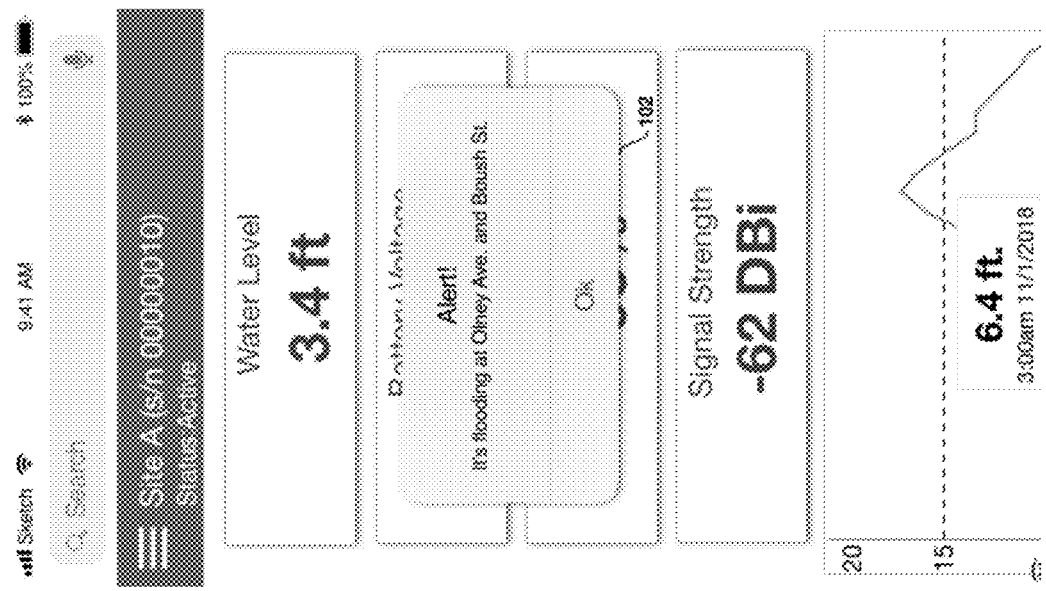
FIG. 15 is an illustrative visual alert example as received on an external client device.

With reference to FIG. 14 and FIG. 15, in certain versions, the external client 500 comprises a external client device processor which is configured to provide a software module configured to receive and display a report (FIG. 14) containing environmental trends or conditions or provide an alert notification (FIG. 15) when certain environmental trends or conditions exceed predefined thresholds.

Although preferred versions of the ESN 100 have been described in considerable detail, other versions of the invention are possible.

All features disclosed in the specification (including and accompanying claims, abstract, and drawings) may be replaced by alternative features serving the same, equivalent or similar purpose unless expressly stated otherwise. Thus, unless stated otherwise, each feature disclosed is one example only of a generic series of equivalent or similar features.

What is claimed is:

1. A platform for monitoring water level elevation at one or more geographical locations, the platform comprising:
 a) a plurality of sensor nodes, each sensor node associated with a predetermined geographical location wherein each sensor node comprises:
  i) an environmental detector configured to collect environmental data pertaining to changes in water level elevation; and
  ii) a telemetry module configured to transmit the environmental data collected by the environmental detector;
 b) a cloud platform configured to support real-time stream processing of sensor node environmental data, the cloud platform comprising one or more cloud servers comprising a cloud server processor and non-transitory computer readable storage media encoded with a computer program including instructions executable by the cloud server processor to create a cloud platform application comprising:
  i) a software module configured to receive and ingest the environmental data;
  ii) a software module configured to apply an algorithm to the environmental data to determine an environmental trend or condition;
  iii) a software module configured to transmit an alert notification when certain environmental trends or conditions exceed predefined thresholds;
 c) wherein the environmental condition or trend at one or more node sensors in a geographical area comprises: current water level elevation, history of water level elevation, change in water level elevation, rate of water elevation change over time, water level elevation compared to historic potential, comparison of water level elevation at a first location with that of a second location within a geographical region, trends of a plurality of conditions, and the correlation of a plurality of conditions.

2. The platform according to claim 1, further comprising an external client device comprising an external client device processor configured to provide a software module configured to receive and display either the environmental data report or the alert notification.

3. The platform according to claim 2, wherein the external claim device comprises external computer systems, social media, cellular phone, a smartphone device, a tablet, or a smart watch, and external systems.

4. The platform according to claim 1, wherein at least one sensor node further comprises: a data collection module, the data collection module comprising a processor and non-transitory computer readable storage media encoded with a computer program including instructions executable by the processor to create a data collection module application comprising: a software module configured to receive and format the environmental data into a message operably configured for transmission; and a software module configured to wirelessly transmit the environmental data via the telemetry module.

5. The platform according to claim 1, wherein the cloud platform further comprises a software module configured to manage the plurality of sensor nodes.

6. The platform according to claim 1, wherein the cloud platform further comprises a software module configured to store the environmental data.

7. The platform according to claim 1, wherein the cloud platform further comprises a software module configured to generate an environmental data report comprising the environmental trend or condition; and a software module configured to transmit the environmental data report.

8. The platform according to claim 7, wherein the environmental data report comprises information related to current water level elevation and conditions, water level elevation rate of change over time, trending water levels, water level elevation history, water surge conditions, or regional graphical trends.

9. The platform according to claim 1, wherein the detector comprises a non-contact water level sensor.

10. The platform according to claim 1, wherein the detector comprises an ultrasonic sensor measuring the distance between the sensor and the surface of the water.

11. The platform according to claim 1, wherein a sensor data collection module comprises a software module configured to periodically transmit the environmental data at a predetermined rate via the sensor telemetry module.

12. The platform according to claim 1, wherein the cloud platform further comprises a software module configured to normalize the environmental data received from each sensor, the normalizing comprising removing erroneous data, adding a date and time stamp, adding geolocation data and/or the assignment of the event to a customer domain.

13. The platform according to claim 1, wherein the alert notification comprises information related to current water level conditions, trending water levels, flooding areas, water surge conditions, or regional graphical trends.

14. The platform according to claim 1, wherein the sensor telemetry module is configured to transmit the environmental data to the software module configured to receive the environmental data.

15. The platform according to claim 1, wherein the sensor telemetry module is configured to transmit the environmental data to a communication protocol infrastructure, the communication protocol infrastructure comprising an input telemetry module configured to receive the environmental data from at least one of the plurality of sensor nodes; and an output telemetry module configured to transmit the environmental data to the cloud platform software module configured to receive the environmental data.

16. A platform for monitoring water level elevation at one or more geographical locations, the platform comprising:
   a) a plurality of sensor nodes, each sensor node associated with a predetermined geographical location, wherein each sensor node comprises:
      i) an environmental detector configured to collect environmental data pertaining to changes in water level elevation;
      ii) a telemetry module configured to wirelessly transmit the environmental data collected by the environmental detector;
      iii) a data collection module, the data collection module comprising a processor and non-transitory computer readable storage media encoded with a computer program including instructions executable by the processor to create a data collection module application comprising:
         (1) a software module configured to receive and format the environmental data into a message suitable for transmission; and
         (2) a software module configured to wirelessly transmit the environmental data via the telemetry module;
   b) a gateway device configured to receive and route the environmental data, the gateway device comprising;
      i) an input telemetry module configured to receive the environmental data from the one or more plurality of sensor nodes;
      ii) an output telemetry module configured to transmit the environmental data;
      iii) a gateway data collection module, the gateway data collection module comprising a gateway processor and non-transitory computer readable storage media encoded with a computer program including instructions executable by the gateway processor to create a gateway device application comprising:
         (1) a software module configured to receive the environmental data via the input telemetry module;
         (2) a software module configured to apply an algorithm to the environmental data to normalize and aggregate environmental data;
         (3) a software module configured to transmit the environmental data via the output telemetry module;
   c) a cloud platform configured to support real-time stream processing of sensor node environmental data, the cloud platform comprising one or more cloud servers comprising a cloud server processor and non-transitory computer readable storage media encoded with a computer program including instructions executable by the cloud server processor to create a cloud platform application comprising:
      i) a software module configured to receive and ingest the environmental data;
      ii) a software module configured to manage the plurality of sensor nodes;
      iii) a software module configured to store the environmental data;
      iv) a software module configured to apply an algorithm to the environmental data to determine an environmental trend or condition;
      v) a software module configured to generate an environmental data report comprising the environmental trend or condition; and
      vi) a software module configured to transmit the environmental data report;
      vii) a software module configured to transmit an alert notification when certain environmental trends or conditions exceed predefined thresholds;
      viii) wherein an environmental condition or trend at one or more node sensors in a geographical area comprises: current water level elevation, change in water level elevation, rate of water elevation change over time, water level elevation compared to historic potential, comparison of water level elevation at a first location with that of a second location within a geographical region, trends of a plurality of conditions, and correlation of a plurality of conditions; and
   d) an external client device comprising an external client device processor configured to provide a software module configured to receive and display either the environmental data report or the alert notification.

17. The platform according to claim 16, wherein the external claim device comprises computer systems, cellular phone a smartphone device, a tablet, or a smart watch, and external systems.

18. The platform according to claim 16, wherein the detector comprises a non-contact water level sensor.

19. The platform according to claim 16, wherein the detector comprises an ultrasonic sensor measuring the distance between the sensor and the surface of the water.

20. The platform according to claim 16, wherein the sensor data collection module further comprises a software module configured to periodically transmit the environmental data at a predetermined rate via the sensor telemetry module.

21. The platform according to claim 16, wherein the cloud platform further comprises a software module configured to normalize the environmental data received from each sensor, the normalizing comprising removing erroneous data, adding a date and time stamp, adding geolocation data and/or the assignment of the event to a customer domain.

22. The platform according to claim 16, wherein the environmental data report comprises information related to current water level conditions, trending water levels, water surge conditions, or regional graphical trends.

23. The platform according to claim 16, wherein the alert notification comprises information related to current water level conditions, trending water levels, water surge conditions, or regional graphical trends.

\* \* \* \* \*